(12) United States Patent
Gao et al.

(10) Patent No.: US 11,923,929 B2
(45) Date of Patent: Mar. 5, 2024

(54) CHANNEL INFORMATION OBTAINING METHOD

(71) Applicant: HUAWEI TECHNOLOGIES CO., LTD., Guangdong (CN)

(72) Inventors: Xinyu Gao, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 17/741,143

(22) Filed: May 10, 2022

(65) Prior Publication Data
US 2022/0271805 A1 Aug. 25, 2022

Related U.S. Application Data

(63) Continuation of application No. PCT/CN2019/117400, filed on Nov. 12, 2019.

(51) Int. Cl.
*H04B 7/04* (2017.01)
*H04B 7/0456* (2017.01)
*H04L 5/00* (2006.01)

(52) U.S. Cl.
CPC ......... *H04B 7/0456* (2013.01); *H04L 5/0048* (2013.01)

(58) Field of Classification Search
CPC .. H04B 7/0456; H04B 7/04013; H04L 5/0048
(Continued)

(56) References Cited

U.S. PATENT DOCUMENTS

2010/0034146 A1* 2/2010 Hou .............. H04B 7/0417 370/328
2013/0242896 A1 9/2013 Son et al.
(Continued)

FOREIGN PATENT DOCUMENTS

| CN | 109302220 A | 2/2019 |
| CN | 109495149 A | 3/2019 |

OTHER PUBLICATIONS

PCT International Search Report and Written Opinion issued in International Application No. PCT/CN2019/117400 dated Jul. 27, 2020, 15 pages (with English translation).
(Continued)

*Primary Examiner* — Emmanuel Bayard
(74) *Attorney, Agent, or Firm* — Fish & Richardson P.C.

(57) ABSTRACT

This application provides channel information obtaining methods and communications apparatuses, to reduce pilot overheads and a delay of obtaining channel information. In an example method, a terminal device receives one or more first reference signals on a $d^{th}$ port of the terminal device, where the first reference signal is a reference signal from a first network device. The terminal device obtains a first channel vector $h_{1,d}$ based on the received first reference signal, where $h_{1,d}$ a channel vector of a channel between the $d^{th}$ port of the terminal device and the first network device. The terminal device receives N second reference signals on the $d^{th}$ port of the terminal device. The terminal device obtains a second channel vector $h_{2,d}$ based on the received second reference signal.

18 Claims, 8 Drawing Sheets

(58) Field of Classification Search
USPC .................................................. 375/267, 299
See application file for complete search history.

(56) References Cited

U.S. PATENT DOCUMENTS

| | | | | |
|---|---|---|---|---|
| 2014/0064400 | A1* | 3/2014 | Nammi | H04B 17/336 375/267 |
| 2015/0003573 | A1* | 1/2015 | Fechtel | H04B 1/12 375/348 |
| 2015/0207555 | A1* | 7/2015 | Son | H04B 7/0478 375/267 |
| 2016/0112167 | A1* | 4/2016 | Xu | H04L 5/0048 370/329 |
| 2016/0142189 | A1 | 5/2016 | Shin et al. | |
| 2016/0143055 | A1* | 5/2016 | Nammi | H04B 7/0617 370/329 |
| 2019/0021092 | A1* | 1/2019 | Fakoorian | H04B 7/0854 |
| 2021/0075474 | A1* | 3/2021 | Raghavan | H04B 7/0417 |

OTHER PUBLICATIONS

Yang et al., "Intelligent Reflecting Surface Meets OFDM: Protocol Design and Rate Maximization," arxiv.org arXiv: 1906.09956v1, Jun. 21, 2019, 30 pages.

Qurrat-Ul-Ain Nadeem et al., "Intelligent Reflecting Surface Assisted Multi-User MISO Communication," arxiv.org arXiv: 1906.02360v1, Jun. 6, 2019, 8 pages.

Supplementary European Search Report in European Appln No. 19952335.8, dated Oct. 18, 2022, 16 pages.

Wu et al., "Intelligent Reflecting Surface Enhanced Wireless Network: Joint Active and Passive Beamforming Design," 2018 IEEE Global Communications Conference, arXiv:1809.01423v2, Sep. 12, 2018, 6 pages.

Extended European Search Report in European Appln No. 19952335.8, dated Feb. 2, 2023, 17 pages.

* cited by examiner

CHANNEL INFORMATION OBTAINING METHOD

CROSS-REFERENCE TO RELATED APPLICATIONS

This application is a continuation of International Application No. PCT/CN2019/117400, filed on Nov. 12, 2019, the disclosure of which is hereby incorporated by reference in its entirety.

TECHNICAL FIELD

This application relates to the communications field, and more specifically, to a channel information obtaining method.

BACKGROUND

A new MIMO system may be formed by adding another network device to an existing multiple input multiple output (multiple input multiple output, MIMO) system. During actual application, the MIMO system needs to know complete channel information. Frequency division duplex (frequency division duplex, FDD) downlink transmission is used as an example. To perform joint precoding between a first network device and a second network device, the MIMO system to which the another network device is added needs to separately know information about a channel between the first network device and a terminal device and information about a channel between the first network device, the second network device, and the terminal device. Because there are hundreds of thousands of array elements in the second network device, the channel between the first network device, the second network device, and the terminal device is usually of a large dimension. Therefore, a method with low pilot overheads, a low delay, and high precision is urgently required to obtain the information about the channel between the first network device, the second network device, and the terminal device.

SUMMARY

This application provides a channel information obtaining method, to reduce pilot overheads and a delay in a process of obtaining information about a channel between a first network device, a second network device, and a terminal device.

According to a first aspect, a channel information obtaining method is provided. The method includes: A terminal device receives one or more first reference signals on a $d^{th}$ port of the terminal device, where the first reference signal is a reference signal from a first network device, $d \in [1, D]$, D is a quantity of ports of the terminal device, and D is a positive integer. The terminal device obtains a first channel vector $h_{1,d}$ based on the received first reference signal, where $h_{1,d}$ is a channel vector of a channel between the $d^{th}$ port of the terminal device and the first network device. The terminal device receives N second reference signals on the $d^{th}$ port of the terminal device, where N is a quantity of ports of the second reference signal, and N is an integer greater than or equal to 2. The terminal device obtains a second channel vector $h_{2,d}$ based on the received second reference signal. The terminal device calculates a third channel vector $h_{3,d}$ based on $h_{1,d}$ and $h_{2,d}$, where a quantity of ports of $h_{3,d}$ is less than a quantity of ports of a fourth channel vector $h_{4,d}$, and $h_{4,d}$ is a channel vector of a channel between the first network device, a second network device, and the $d^{th}$ port of the terminal device. The terminal device calculates $h_{4,d}$ based on $h_{3,d}$.

Based on the foregoing technical solution, the quantity of ports of the third channel vector obtained by the terminal device based on the received second reference signal is less than the quantity of ports of the fourth channel vector. In this case, the terminal device may calculate the fourth channel vector based on the third channel vector by using a compressed sensing algorithm or an artificial intelligence algorithm, to reduce pilot overheads and a delay of obtaining the fourth channel vector.

With reference to the first aspect, in some implementations of the first aspect, each second reference signal includes a first component and a second component, the first component is generated through precoding based on a first precoding matrix $w_n(n=1, 2, \ldots, N)$, the second component is generated through precoding based on the first precoding matrix and a second precoding matrix $\theta_n(n=1, 2, \ldots, N)$, and the first precoding matrix and the second precoding matrix are used to process $h_{4,d}$ to obtain $h_{3,d}$.

With reference to the first aspect, in some implementations of the first aspect, the second precoding matrix is specifically represented as $\theta_n(n=1, 2, \ldots, N)=Vb_n(n=1, 2, \ldots, N)$, where V is a matrix formed by a group of orthogonal bases, and $b_n(n=1, 2, \ldots, N)$ is one of the following matrices: a Gaussian random distribution matrix and a Bernoulli random distribution matrix.

With reference to the first aspect, in some implementations of the first aspect, the first precoding matrix is specifically represented as $w_n(n=1, 2, \ldots, N)=Ua_n(n=1, 2, \ldots, N)$, where U is a matrix formed by a group of orthogonal bases, and $a_n(n=1, 2, \ldots, N)$ is one of the following matrices: a Gaussian random distribution matrix and a Bernoulli random distribution matrix.

Based on the foregoing technical solution, after the fourth channel vector is processed by using the first precoding matrix and the second precoding matrix, the third channel vector whose quantity of ports is less than the quantity of ports of the fourth channel vector may be obtained.

With reference to the first aspect, in some implementations of the first aspect, that the terminal device calculates a third channel vector $h_{3,d}$ based on $h_{1,d}$ and $h_{2,d}$ includes: The terminal device calculates $h_{3,d}$ according to a formula $h_{3,d}=h_{2,d}-[h_{1,d}w_1, h_{1,d}w_2, \ldots, h_{1,d}w_N]^T$, where $w_n(n=1, 2, \ldots, N)$ is the first precoding matrix.

With reference to the first aspect, in some implementations of the first aspect, that the terminal device calculates $h_{4,d}$ based on $h_{3,d}$ includes: The terminal device calculates $h_{4,d}$ according to a formula $h_{3,d}=\Phi h_{4,d}$, where $\Phi$ is a function $f(\theta_n(n=1, 2, \ldots, N), w_n(n=1, 2, \ldots, N))$ of the first precoding matrix and the second precoding matrix $\theta_n(n=1, 2, \ldots, N)$.

With reference to the first aspect, in some implementations of the first aspect, $\Phi$ is represented as $\Phi=[w_1^T \otimes \theta_1^H, w_2^T \otimes \theta_2^H, \ldots, w_N^T \otimes \theta_N^H]^T$.

With reference to the first aspect, in some implementations of the first aspect, the method further includes: The terminal device calculates the first precoding matrix and the second precoding matrix. The terminal device sends the first precoding matrix and the second precoding matrix to the first network device.

With reference to the first aspect, in some implementations of the first aspect, the method further includes: The terminal device receives the first precoding matrix and the second precoding matrix.

With reference to the first aspect, in some implementations of the first aspect, the first precoding matrix and the second precoding matrix are specified in a communications protocol.

With reference to the first aspect, in some implementations of the first aspect, the method further includes: The terminal device obtains a third precoding matrix $\overline{w}$ and a fourth precoding matrix $\overline{\theta}$ based on $h_{1,d}$ and $h_{4,d}$, where $\overline{w}$ is a precoding matrix used when the first network device transmits data to the terminal device, and $\overline{\theta}$ is a precoding matrix used when the second network device transmits data to the terminal device. The terminal device sends $\overline{w}$ and $\overline{\theta}$ to the first network device.

Based on the foregoing technical solution, there are low feedback overheads because the terminal device feeds back only the third precoding matrix $\overline{w}$ and the fourth precoding matrix $\overline{\theta}$ to the first network device.

With reference to the first aspect, in some implementations of the first aspect, that the terminal device obtains a third precoding matrix $\overline{w}$ and a fourth precoding matrix $\overline{\theta}$ based on $h_{1,d}$ and $h_{4,d}$ includes: The terminal device iterates the following two processes by using a first indicator as an optimization target until the optimization target is no longer added: (1) fixing $\overline{w}$ and calculating $\overline{\theta}$; and (2) fixing $\overline{\theta}$ and calculating $\overline{w}$, where the first indicator includes one or more of the following: spectrum efficiency, energy efficiency, a transmission rate, and an error between the first indicator and a target transmission solution.

With reference to the first aspect, in some implementations of the first aspect, $\overline{\theta}$ is $\exp(-j(\arg(h_{1,d}\overline{w})-\arg(H_{4,d}\overline{w})))$, where $\text{vec}(H_{4,d})=h_{4,d}$, and $\arg(.)$ represents a phase extraction operation.

With reference to the first aspect, in some implementations of the first aspect, $\overline{w}$ is $$\alpha \frac{(h_{1,d}^H + \overline{\theta}^H H_{4,d})^H}{\|h_{1,d}^H + \overline{\theta}^H H_{4,d}\|_2},$$

where $\text{vec}(H_{4,d})=h_{4,d}$, and $\alpha$ is a non-zero constant.

With reference to the first aspect, in some implementations of the first aspect, the method further includes: The terminal device sends $h_{1,d}$ and $h_{4,d}$ to the first network device.

With reference to the first aspect, in some implementations of the first aspect, the N second reference signals are sent in a time division multiplexing manner.

According to a second aspect, a channel information obtaining method is provided. The method includes: A second network device receives N third reference signals from a first network device, where N is a quantity of ports of the third reference signal, and N is an integer greater than or equal to 2. The second network device generates N fourth reference signals, where an $n^{th}$ fourth reference signal is a reference signal generated after the second network device precodes an $n^{th}$ third reference signal based on a second precoding matrix $\theta_n(n=1, 2, \ldots, N)$, $n \in [1, N]$, the second precoding matrix is used to process a fourth channel vector $h_{4,d}$ to obtain a third channel vector $h_{3,d}$, a quantity of ports of $h_{3,d}$ is less than a quantity of ports of $h_{4,d}$, $h_{4,d}$ is a channel vector of a channel between the first network device, the second network device, and a $d^{th}$ port of a terminal device, $d \in [1, D]$, D is a quantity of ports of the terminal device, and D is a positive integer. The second network device sends the N fourth reference signals to the terminal device.

Based on the foregoing technical solution, the second network device processes the fourth channel vector by using the second precoding matrix. The quantity of ports of the obtained third channel vector is less than the quantity of ports of the fourth channel vector. In addition, in this case, the fourth channel vector may be calculated based on the third channel vector, to reduce pilot overheads and a delay of obtaining the fourth channel vector.

With reference to the second aspect, in some implementations of the second aspect, the second precoding matrix is specifically represented as $\theta_n(n=1, 2, \ldots, N)=Vb_n(n=1, 2, \ldots, N)$, where V is a matrix formed by a group of orthogonal bases, and $b_n(n=1, 2, \ldots, N)$ is one of the following matrices: a Gaussian random distribution matrix and a Bernoulli random distribution matrix.

With reference to the second aspect, in some implementations of the second aspect, before that the second network device generates N fourth reference signals, the method further includes: The second network device receives the second precoding matrix from the first network device.

With reference to the second aspect, in some implementations of the second aspect, the second precoding matrix is specified in a communications protocol.

With reference to the second aspect, in some implementations of the second aspect, the method further includes: The second network device receives a fourth precoding matrix $\overline{\theta}$ from the first network device, where $\overline{\theta}$ is a precoding matrix used when the second network device transmits data to the terminal device.

With reference to the second aspect, in some implementations of the second aspect, that the second network device sends the N fourth reference signals to the terminal device includes: The second network device sends the N fourth reference signals to the terminal device in a time division multiplexing manner.

According to a third aspect, a channel information obtaining method is provided. The method includes: A first network device sends one or more first reference signals, where the first reference signal is used to calculate a first channel vector $h_{1,d}$, $h_{1,d}$ is a channel vector of a channel between a $d^{th}$ port of a terminal device and the first network device, $d \in [1, D]$, D is a quantity of ports of the terminal device, and D is a positive integer. The first network device sends N third reference signals, where the third reference signal is a reference signal precoded by the first network device based on a first precoding matrix $w_n(n=1, 2, \ldots, N)$, N is a quantity of ports of the third reference signal, and N is an integer greater than or equal to 2.

Based on the foregoing technical solution, the first network device sends different references to the terminal device. Therefore, the terminal device may obtain different channel information based on the received different reference signals.

With reference to the third aspect, in some implementations of the third aspect, the first precoding matrix is specifically represented as $w_n(n=1, 2, \ldots, N)=Ua_n(n=1, 2, \ldots, N)$, where U is a matrix formed by a group of orthogonal bases, and $a_n(n=1, 2, \ldots, N)$ is one of the following matrices: a Gaussian random distribution matrix and a Bernoulli random distribution matrix.

With reference to the third aspect, in some implementations of the third aspect, before that the first network device sends N third reference signals, the method further includes: The first network device receives the first precoding matrix and a second precoding matrix $\theta_n(n=1, 2, \ldots, N)$ from the terminal device, where the second precoding matrix is a matrix used by a second network device to precode the third reference signal. The first network device sends the second precoding matrix to the second network device.

With reference to the third aspect, in some implementations of the third aspect, before that the first network device sends N third reference signals, the method further includes: The first network device calculates the first precoding matrix and a second precoding matrix $\theta_n(n=1, 2, \ldots, N)$, where the second precoding matrix is a matrix used by a second network device to precode the third reference signal. The first network device sends the first precoding matrix and the second precoding matrix to the terminal device. The first network device sends the second precoding matrix to the second network device.

Based on the foregoing technical solution, the first network device processes a fourth channel vector by using the first precoding matrix, and the second network device processes the fourth channel vector by using the second precoding matrix. A quantity of ports of an obtained third channel vector is less than a quantity of ports of the fourth channel vector. In addition, in this case, the fourth channel vector may be calculated based on the third channel vector, to reduce pilot overheads and a delay of obtaining the fourth channel vector.

With reference to the third aspect, in some implementations of the third aspect, the first precoding matrix is specified in a communications protocol.

With reference to the third aspect, in some implementations of the third aspect, the method further includes: The first network device receives $h_{1,d}$ and $h_{4,d}$ from the terminal device.

With reference to the third aspect, in some implementations of the third aspect, the method further includes: The first network device obtains a third precoding matrix $\overline{w}$ and a fourth precoding matrix $\overline{\theta}$ based on $h_{1,d}$ and $h_{4,d}$, where $\overline{w}$ is a precoding matrix used when the first network device transmits data to the terminal device, and $\overline{\theta}$ is a precoding matrix used when the second network device transmits data to the terminal device. The first network device sends $\overline{\theta}$ to the second network device.

Based on the foregoing technical solution, the first network device calculates the third precoding matrix $\overline{w}$ and the fourth precoding matrix $\overline{\theta}$ based on received $h_{1,d}$ and $h_{4,d}$. Because the first network device has channel information of all terminal devices, multi-user interference can be effectively eliminated.

With reference to the third aspect, in some implementations of the third aspect, that the first network device obtains a third precoding matrix $\overline{w}$ and a fourth precoding matrix $\overline{\theta}$ based on $h_{1,d}$ and $h_{4,d}$ includes: The first network device iterates the following two processes by using a first indicator as an optimization target until the optimization target is no longer added: (1) fixing $\overline{w}$ and calculating $\overline{\theta}$; and (2) fixing $\overline{\theta}$ and calculating $\overline{w}$, where the first indicator includes one or more of the following: spectrum efficiency, energy efficiency, a transmission rate, and an error between the first indicator and a target transmission solution.

With reference to the third aspect, in some implementations of the third aspect, $\overline{\theta}$ is $\exp(-j(\arg(h_{1,d}\overline{w})-\arg(H_{4,d}\overline{w})))$, where $\text{vec}(H_{4,d})=h_{4,d}$, and $\arg(.)$ represents a phase extraction operation.

With reference to the third aspect, in some implementations of the third aspect, $\overline{w}$ is $$\alpha \frac{(h_{1,d}^H + \overline{\theta}^H H_{4,d})^H}{\|h_{1,d}^H + \overline{\theta}^H H_{4,d}\|_2},$$

where $\text{vec}(H_{4,d})=h_{4,d}$, and $\alpha$ is a non-zero constant.

According to a fourth aspect, a channel information obtaining apparatus is provided. The apparatus includes a transceiver unit and a processing unit. The transceiver unit is configured to receive one or more first reference signals, where the first reference signal is a reference signal from a first network device. The processing unit is configured to obtain a first channel vector $h_{1,d}$ based on the received first reference signal, where $h_{1,d}$ is a channel vector of a channel between a $d^{th}$ port of the apparatus and the first network device, $d \in [1, D]$, D is a quantity of ports of the apparatus, and D is a positive integer. The transceiver unit is further configured to receive N second reference signals, where N is a quantity of ports of the second reference signal, and N is an integer greater than or equal to 2. The processing unit is further configured to obtain a second channel vector $h_{2,d}$ based on the received second reference signal. The processing unit is further configured to calculate a third channel vector $h_{3,d}$ based on $h_{1,d}$ and $h_{2,d}$, where a quantity of ports of $h_{3,d}$ is less than a quantity of ports of a fourth channel vector $h_{4,d}$, and $h_{4,d}$ is a channel vector of a channel between the first network device, a second network device, and the $d^{th}$ port of the apparatus. The processing unit is further configured to calculate $h_{4,d}$ based on $h_{3,d}$.

With reference to the fourth aspect, in some implementations of the fourth aspect, each second reference signal includes a first component and a second component, the first component is generated through precoding based on a first precoding matrix $w_n(n=1, 2, \ldots, N)$, the second component is generated through precoding based on the first precoding matrix and a second precoding matrix $\theta_n(n=1, 2, \ldots, N)$, and the first precoding matrix and the second precoding matrix are used to process $h_{4,d}$ to obtain $h_{3,d}$.

With reference to the fourth aspect, in some implementations of the fourth aspect, the second precoding matrix is specifically represented as $\theta_n(n=1, 2, \ldots, N)=Vb_n(n=1, 2, \ldots, N)$, where V is a matrix formed by a group of orthogonal bases, and $b_n(n=1, 2, \ldots, N)$ is one of the following matrices: a Gaussian random distribution matrix and a Bernoulli random distribution matrix.

With reference to the fourth aspect, in some implementations of the fourth aspect, the first precoding matrix is specifically represented as $w_n(n=1, 2, \ldots, N)=Ua_n(n=1, 2, \ldots, N)$, where U is a matrix formed by a group of orthogonal bases, and $a_n(n=1, 2, \ldots, N)$ is one of the following matrices: a Gaussian random distribution matrix and a Bernoulli random distribution matrix.

With reference to the fourth aspect, in some implementations of the fourth aspect, that the processing unit calculates a third channel vector $h_{3,d}$ based on $h_{1,d}$ and $h_{2,d}$ includes: The processing unit calculates $h_{3,d}$ according to a formula $h_{3,d}=h_{2,d}-[h_{1,d}w_1, h_{1,d}w_2, \ldots, h_{1,d}w_N]^T$, where $w_n(n=1, 2, \ldots, N)$ is the first precoding matrix.

With reference to the fourth aspect, in some implementations of the fourth aspect, that the processing unit calculates $h_{4,d}$ based on $h_{3,d}$ includes: The processing unit calculates $h_{4,d}$ according to a formula $h_{3,d}=\Phi h_{4,d}$, where $\Phi$ is a function $f(\theta_n(n=1, 2, \ldots, N), w_n(n=1, 2, \ldots, N))$ of the first precoding matrix and the second precoding matrix $\theta_n(n=1, 2, \ldots, N)$.

With reference to the fourth aspect, in some implementations of the fourth aspect, $\Phi$ is represented as $\Phi[w_1^T \otimes \theta_1^T, w_2^T \otimes \theta_2^T, \ldots, w_N^T \otimes \theta_N^T]^T$.

With reference to the fourth aspect, in some implementations of the fourth aspect, the processing unit is further configured to calculate the first precoding matrix and the second precoding matrix. The transceiver unit is further configured to send the first precoding matrix and the second precoding matrix to the first network device.

With reference to the fourth aspect, in some implementations of the fourth aspect, the transceiver unit is further configured to receive the first precoding matrix and the second precoding matrix.

With reference to the fourth aspect, in some implementations of the fourth aspect, the first precoding matrix and the second precoding matrix are specified in a communications protocol.

With reference to the fourth aspect, in some implementations of the fourth aspect, the processing unit is further configured to obtain a third precoding matrix $\overline{w}$ and a fourth precoding matrix $\overline{\theta}$ based on $h_{1,d}$ and $h_{4,d}$, where $\overline{w}$ is a precoding matrix used when the first network device transmits data to the apparatus, and $\overline{\theta}$ is a precoding matrix used when the second network device transmits data to the apparatus. The transceiver unit is further configured to send $\overline{w}$ and $\overline{\theta}$ to the first network device.

With reference to the fourth aspect, in some implementations of the fourth aspect, that the processing unit is further configured to obtain a third precoding matrix $\overline{w}$ and a fourth precoding matrix $\overline{\theta}$ based on $h_{1,d}$ and $h_{4,d}$ includes: The processing unit iterates the following two processes by using a first indicator as an optimization target until the optimization target is no longer added: (1) fixing $\overline{w}$ and calculating $\overline{\theta}$; and (2) fixing $\overline{\theta}$ and calculating $\overline{w}$, where the first indicator includes one or more of the following: spectrum efficiency, energy efficiency, a transmission rate, and an error between the first indicator and a target transmission solution.

With reference to the fourth aspect, in some implementations of the fourth aspect, $\overline{\theta}$ is $\exp(-j(\arg(h_{1,d}\overline{w})-\arg(H_{4,d}\overline{w})))$, where $\text{vec}(H_{4,d})=h_{4,d}$, and arg(.) represents a phase extraction operation.

With reference to the fourth aspect, in some implementations of the fourth aspect, $\overline{w}$ is $$\alpha \frac{\left(h_{1,d}^H + \overline{\theta}^H H_{4,d}\right)^H}{\left\|h_{1,d}^H + \overline{\theta}^H H_{4,d}\right\|_2},$$

where $\text{vec}(H_{4,d})=h_{4,d}$, and $\alpha$ is a non-zero constant.

With reference to the fourth aspect, in some implementations of the fourth aspect, the transceiver unit is further configured to send $h_{1,d}$ and $h_{4,d}$ to the first network device.

With reference to the fourth aspect, in some implementations of the fourth aspect, the N second reference signals are sent in a time division multiplexing manner.

According to a fifth aspect, a channel information obtaining apparatus is provided. The apparatus includes a processing unit and a transceiver unit. The transceiver unit is configured to receive N third reference signals from a first network device, where N is a quantity of ports of the third reference signal, and N is an integer greater than or equal to 2. The processing unit generates N fourth reference signals, where an $n^{th}$ fourth reference signal is a reference signal generated after the apparatus precodes an $n^{th}$ third reference signal based on a second precoding matrix $\theta_n(n=1, 2, \ldots, N)$, $n \in [1, N]$, the second precoding matrix is used to process a fourth channel vector $h_{4,d}$ to obtain a third channel vector $h_{3,d}$, a quantity of ports of $h_{3,d}$ is less than a quantity of ports of $h_{4,d}$, $h_{4,d}$ is a channel vector of a channel between the first network device, the apparatus, and a $d^{th}$ port of a terminal device, $d \in [1, D]$, D is a quantity of ports of the terminal device, and D is a positive integer. The transceiver unit is further configured to send the N fourth reference signals to the terminal device.

With reference to the fifth aspect, in some implementations of the fifth aspect, the second precoding matrix is specifically represented as $\theta_n(n=1, 2, \ldots, N)=Vb_n(n=1, 2, \ldots, N)$, where V is a matrix formed by a group of orthogonal bases, and $b_n(n=1, 2, \ldots, N)$ is one of the following matrices: a Gaussian random distribution matrix and a Bernoulli random distribution matrix.

With reference to the fifth aspect, in some implementations of the fifth aspect, before that the processing unit generates the N fourth reference signals, the transceiver unit is further configured to receive the second precoding matrix from the first network device.

With reference to the fifth aspect, in some implementations of the fifth aspect, the second precoding matrix is specified in a communications protocol.

With reference to the fifth aspect, in some implementations of the fifth aspect, the transceiver unit is further configured to receive a fourth precoding matrix $\overline{\theta}$ from the first network device, where $\overline{\theta}$ is a precoding matrix used when the apparatus transmits data to the terminal device.

With reference to the fifth aspect, in some implementations of the fifth aspect, that the transceiver unit sends the N fourth reference signals to the terminal device includes: The transceiver unit sends the N fourth reference signals to the terminal device in a time division multiplexing manner.

According to a sixth aspect, a channel information obtaining apparatus is provided. The apparatus includes a transceiver unit and a processing unit. The transceiver unit is further configured to send one or more first reference signals, where the first reference signal is used to calculate a first channel vector $h_{1,d}$, $h_{1,d}$ is a channel vector of a channel between a $d^{th}$ port of a terminal device and the apparatus, $d \in [1, D]$, D is a quantity of ports of the terminal device, and D is a positive integer. The transceiver unit is further configured to send N third reference signals, where the third reference signal is a reference signal precoded by the apparatus based on a first precoding matrix $w_n(n=1, 2, \ldots, N)$, N is a quantity of ports of the third reference signal, and N is an integer greater than or equal to 2.

With reference to the sixth aspect, in some implementations of the sixth aspect, the first precoding matrix is specifically represented as $w_n(n=1, 2, \ldots, N)=Ua_n(n=1, 2, \ldots, N)$, where U is a matrix formed by a group of orthogonal bases, and $a_n(n=1, 2, \ldots, N)$ is one of the following matrices: a Gaussian random distribution matrix and a Bernoulli random distribution matrix.

With reference to the sixth aspect, in some implementations of the sixth aspect, before that the transceiver unit sends the N third reference signals, the transceiver unit is further configured to receive the first precoding matrix and a second precoding matrix $\theta_n(n=1, 2, \ldots, N)$ from the terminal device, where the second precoding matrix is a matrix used by a second network device to precode the third reference signal. The transceiver unit is further configured to send the second precoding matrix to the second network device.

With reference to the sixth aspect, in some implementations of the sixth aspect, before that the transceiver unit sends the N third reference signals, the processing unit is further configured to calculate the first precoding matrix and a second precoding matrix $\theta_n(n=1, 2, \ldots, N)$, where the second precoding matrix is a matrix used by a second network device to precode the third reference signal. The transceiver unit is further configured to send the first precoding matrix and the second precoding matrix to the terminal device. The transceiver unit is further configured to send the second precoding matrix to the second network device.

With reference to the sixth aspect, in some implementations of the sixth aspect, the first precoding matrix is specified in a communications protocol.

With reference to the sixth aspect, in some implementations of the sixth aspect, the transceiver unit is further configured to receive $h_{1,d}$ and $h_{4,d}$ from the terminal device.

With reference to the sixth aspect, in some implementations of the sixth aspect, the processing unit obtains a third precoding matrix $\overline{w}$ and a fourth precoding matrix $\overline{\theta}$ based on $h_{1,d}$ and $h_{4,d}$, where $\overline{w}$ is a precoding matrix used when the apparatus transmits data to the terminal device, and $\overline{\theta}$ is a precoding matrix used when the second network device transmits data to the terminal device. The transceiver unit is further configured to send $\overline{\theta}$ to the second network device.

With reference to the sixth aspect, in some implementations of the sixth aspect, that the processing unit obtains a third precoding matrix $\overline{w}$ and a fourth precoding matrix $\overline{\theta}$ based on $h_{1,d}$ and $h_{4,d}$ includes: The processing unit iterates the following two processes by using a first indicator as an optimization target until the optimization target is no longer added: (1) fixing $\overline{w}$ and calculating $\overline{\theta}$; and (2) fixing $\overline{\theta}$ and calculating $\overline{w}$, where the first indicator includes one or more of the following: spectrum efficiency, energy efficiency, a transmission rate, and an error between the first indicator and a target transmission solution.

With reference to the sixth aspect, in some implementations of the sixth aspect, $\overline{\theta}$ is $\exp(-j(\arg(h_{1,d}\overline{w})-\arg(H_{4,d}\overline{w})))$, where $\text{vec}(H_{4,d})=h_{4,d}$, and $\arg(.)$ represents a phase extraction operation.

With reference to the sixth aspect, in some implementations of the sixth aspect, $\overline{w}$ is $$\alpha \frac{(h_{1,d}^H + \overline{\theta}^H H_{4,d})^H}{\left\|h_{1,d}^H + \overline{\theta}^H H_{4,d}\right\|_2},$$

where $\text{vec}(H_{4,d})=h_{4,d}$, and $\alpha$ is a non-zero constant.

According to a seventh aspect, a communications apparatus is provided. The communications apparatus includes a processor. The processor is coupled to a memory, and may be configured to execute instructions or data in the memory to implement the method according to any one of the first aspect and the possible implementations of the first aspect. The communications apparatus further includes the memory. The communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip or a chip system disposed in a terminal device. When the communications apparatus is the chip or the chip system configured in the terminal device, the communications interface may be an input/output interface.

The transceiver may be a transceiver circuit. The input/output interface may be an input/output circuit.

According to an eighth aspect, a communications apparatus is provided. The communications apparatus includes a processor. The processor is coupled to a memory and may be configured to execute instructions or data in the memory to implement the method according to any one of the second aspect and the possible implementations of the second aspect. The communications apparatus further includes the memory. The communications apparatus further includes a communications interface, and the processor is coupled to the communications interface.

In an implementation, the communications apparatus is a second network device. When the communications apparatus is the second network device, the communications interface may be a transceiver or an input/output interface.

In another implementation, the communications apparatus is a chip or a chip system configured in a second network device. When the communications apparatus is the chip or the chip system configured in the second network device, the communications interface may be an input/output interface.

The transceiver may be a transceiver circuit. The input/output interface may be an input/output circuit.

According to a ninth aspect, a communications apparatus is provided. The communications apparatus includes a processor. The processor is coupled to a memory and may be configured to execute instructions or data in the memory to implement the method according to any one of the third aspect and the possible implementations of the third aspect. The communications apparatus further includes the memory. The communications apparatus further includes a communications interface, and the processor is coupled to the communications interface.

In an implementation, the communications apparatus is a first network device. When the communications apparatus is the first network device, the communications interface may be a transceiver or an input/output interface.

In another implementation, the communications apparatus is a chip or a chip system configured in a first network device. When the communications apparatus is the chip or the chip system configured in the first network device, the communications interface may be an input/output interface.

The transceiver may be a transceiver circuit. The input/output interface may be an input/output circuit.

According to a tenth aspect, a processor is provided. The processor includes an input circuit, an output circuit, and a processing circuit. The processing circuit is configured to: receive a signal through the input circuit, and transmit the signal through the output circuit, to enable the processor to perform the method according to any one of the first aspect to the third aspect and the possible implementations of the first aspect to the third aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eleventh aspect, a processing apparatus is provided. The processing apparatus includes a processor and a memory. The processor is configured to: read instructions stored in the memory, receive a signal through a receiver, and transmit the signal through a transmitter, to perform the method according to any one of the first aspect to the third aspect and the possible implementations of the first aspect to the third aspect.

There are one or more processors, and there are one or more memories.

The memory may be integrated with the processor, or the memory may be disposed separately from the processor.

In a specific implementation process, the memory may be a non-transitory (non-transitory) memory, for example, a read-only memory (read-only memory, ROM). The memory and the processor may be integrated into one chip, or may be separately disposed on different chips. A type of the memory and a manner of disposing the memory and the processor are not limited in embodiments of this application.

It should be understood that, a related data exchange process, for example, sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the eleventh aspect may be one or more chips or a chip system. The processor in the processing apparatus may be implemented by hardware, or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a twelfth aspect, a computer program product is provided. The computer program product includes a computer program (which may also be referred to as code or an instruction). When the computer program is run, a computer is enabled to perform the method according to any one of the first aspect to the third aspect and the possible implementations of the first aspect to the third aspect.

According to a thirteenth aspect, a computer-readable storage medium is provided. The computer-readable storage medium stores a computer program (which may also be referred to as code or an instruction). When the computer program is run on a computer, the computer is enabled to perform the method according to any one of the first aspect to the third aspect and the possible implementations of the first aspect to the third aspect.

According to a fourteenth aspect, a communications system is provided, and includes the foregoing second network device, the foregoing second network device, and/or the foregoing terminal device.

DESCRIPTION OF EMBODIMENTS

Figure 1:
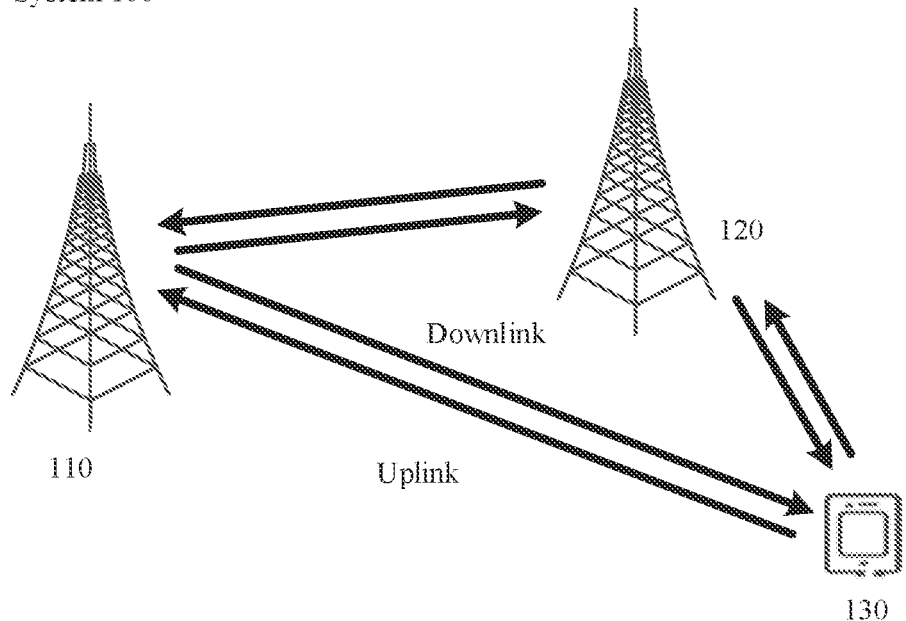
FIG. 1 is a schematic diagram of a wireless communications system to which a method is applied according to an embodiment of this application.

The following describes technical solutions of this application with reference to the accompanying drawings.

The technical solutions in embodiments of this application may be applied to various communications systems, for example, a long term evolution (Long Term Evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a future 5th generation (5th generation, 5G) mobile communications system, and a new radio access technology (new radio access technology, NR) system. The 5G mobile communications system may include non-standalone (non-standalone, NSA) and/or standalone (standalone, SA).

The technical solutions provided in this application may be further applicable to a future communications system, for example, a sixth generation mobile communications system. This is not limited in this application.

In embodiments of this application, the network device may be any device having a wireless transceiver function. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, home evolved NodeB, or home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP) or a transmission reception point (transmission reception point, TRP), or the like. Alternatively, the device may be a gNB or a transmission point (TRP or TP) in a 5G system such as NR, or one or a group of antenna panels (including a plurality of antenna panels) of a base station in a 5G system. Alternatively, the device may be a network node constituting a gNB or a transmission point, such as a baseband unit (BBU) or a distributed unit (distributed unit, DU).

In some deployments, the gNB may include a centralized unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU, or being sent by the DU and the AAU. It may be understood that the network device may be a device including one or more of a CU node, a DU node, and an AAU node. In addition, the CU may be classified as a network device in a radio access network (radio access network, RAN), or the CU may be classified as a network device in a core network (core network, CN). This is not limited in embodiments of this application.

In embodiments of this application, a terminal device may be referred to as user equipment (user equipment, UE), a terminal (terminal), a mobile station (mobile station, MS), a mobile terminal (mobile terminal), or the like. The terminal device may further communicate with one or more core networks through a radio access network (radio access network, RAN). The terminal device may also be referred to as an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a vehicle having a communication function, a wearable device, a terminal device in a future 5G network, or the like. This is not limited in embodiments of this application.

FIG. 1 is a schematic diagram of a wireless communications system to which a method is applied according to an embodiment of this application.

As shown in FIG. 1, the wireless communications system 100 may include at least two network devices, for example, a first network device 110 and a second network device 120 shown in FIG. 1. The second network device 120 may be used as a relay (relay) station between the first network device 110 and a terminal device 130.

Figure 2:
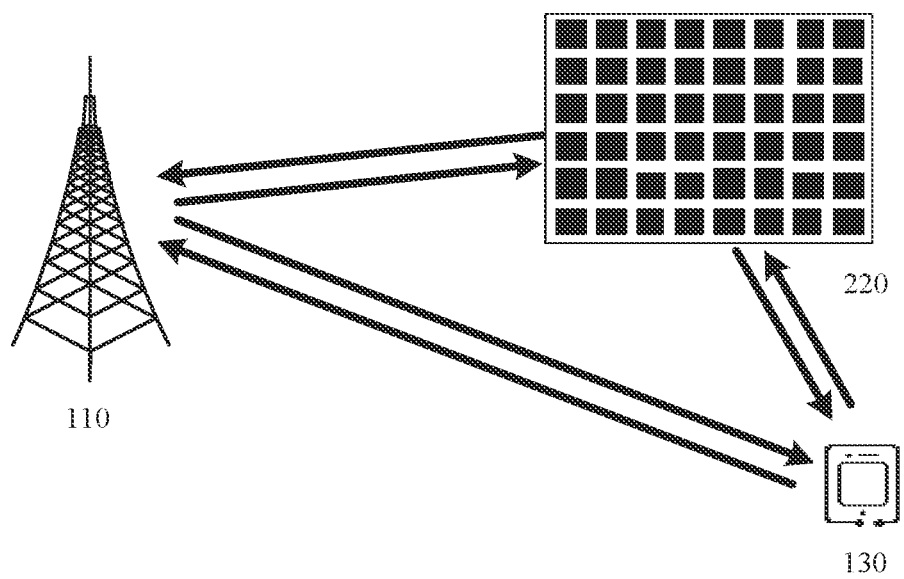
FIG. 2 is a schematic diagram of another wireless communications system to which a method is applied according to an embodiment of this application.

In an implementation, the second network device may alternatively be an intelligent reflecting surface (intelligent reflecting surface, IRS). As shown in FIG. 2, an IRS 220 in a wireless communications system 200 may be used as a relay station between the first network device 110 and the terminal device 130. The IRS 220 includes hundreds of thousands of passive metasurface array elements.

The wireless communications system 100 includes at least one terminal device, for example, the terminal device 130 shown in FIG. 1. The first network device and the terminal device may directly communicate with each other, for example, the first network device 110 shown in FIG. 1 may transmit data to the terminal device 130 through a downlink, or the terminal device 130 may transmit data to the first network device through an uplink. When a transmission path between the first network device and the terminal device is blocked, the first network device may perform reliable transmission with the terminal device by using the second network device. For example, as shown in FIG. 1, the first network device 110 transmits, to the second network device 120, data to be transmitted to the terminal device 130, and then the second network device 120 reflects the received data to the terminal device 130. Alternatively, the terminal device 130 transmits, to the second network device 120, data to be transmitted to the first network device 110, and then the second network device 120 reflects the received data to the first network device 110.

It should be understood that the figure is merely an example. The figure shows one first network device, one terminal device, and one second network device. However, this should not constitute any limitation on this application. The communications system may further include more first network devices, terminal devices, and second network devices.

The wireless communications system 100 may support downlink MIMO. Specifically, the wireless communications system 100 may support single-user multiple input multiple output (single-user multiple input multiple output, SU-MIMO), or the wireless communications system 100 may support multi-user multiple input multiple output (multi-user multiple input multiple output, MU-MIMO). The first network device 110 may send downlink data to a single user or to a plurality of users by using an existing spatial multiplexing technology. For brevity, details are not described herein.

As shown in FIG. 1, when the wireless communications system 100 is applied to a multiple input multiple output scenario, each array element in the second network device may independently perform amplitude and phase adjustment on an incident signal, to obtain a very high array gain. In addition, the second network device may further introduce an additional propagation path, to improve channel quality.

For example, the second network device is an IRS. The IRS controls a status of a semiconductor device on the back of each metasurface array element, for example, controls enabling and disabling of a PIN diode, so that each array element can independently perform amplitude and phase adjustment on an incident signal, to obtain a very high array gain. In addition, the IRS only needs to configure a simple control circuit to control an amplitude and phase modulation factor of each array element, and does not need to have a baseband capability, and therefore has very low power consumption and costs. Therefore, an intelligent reflecting surface aided multiple input multiple output (intelligent reflecting surface aided multiple input multiple output, IRS-aided MIMO) system formed by adding the IRS to a conventional MIMO system can further improve spectrum efficiency without significantly increasing power consumption and costs.

When the wireless communications system 100 is applied to a multiple input multiple output scenario, the system 100 needs to know complete channel information to obtain the foregoing advantages. FDD downlink transmission is used as an example. To perform joint precoding between the first network device and the second network device, the system 100 needs to separately know a vector of channel between the first network device and the terminal device and a vector of a channel between the first network device, the second network device, and the terminal device. Because there are hundreds of thousands of array elements in the second network device, the channel between the first network device, the second network device, and the terminal device is usually of a large dimension. Therefore, a method with low pilot overheads, a low delay, and high precision is urgently required to estimate the channel between the first network device, the second network device, and the terminal device.

For example, the second terminal device is an IRS. There are hundreds of thousands of array elements in the IRS, and the IRS does not have a baseband function. Therefore, the channel between the first network device, the IRS, and the terminal device needs to be estimated on the terminal device side, and the channel can be estimated only by sending a channel state information-reference signal (channel state information-reference signal, CSI-RS) in a time division multiplexing (time division multiplexing, TDM) manner.

Figure 3:
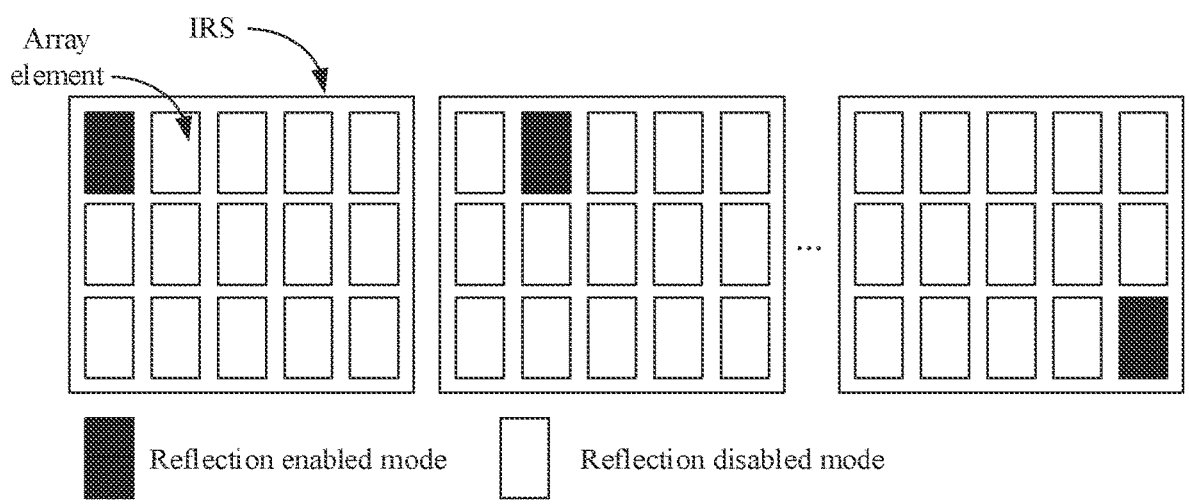
FIG. 3 is a schematic diagram of a channel estimation method in an intelligent reflecting surface aided multiple input multiple output system.

A current existing method for channel estimation in an IRS-aided MIMO system is as follows: First, the first network device notifies the IRS to disable all array elements. Then, the first network device sends a CSI-RS to the terminal device. The first network device may send the CSI-RS in a plurality of manners. For example, the first network device may send the CSI-RS in a TDM manner. Alternatively, the first network device may send the CSI-RS in a frequency division multiplexing (frequency division multiplexing, FDM) manner. Alternatively, the first network device may send the CSI-RS in a code division multiplexing (code division multiplexing, CDM) manner. The terminal device estimates a channel between the first network device and the terminal device based on the received signal. Then, the first network device notifies the IRS to enable array elements one by one, and sends the CSI-RS in a TDM manner. As shown in FIG. 3, before the terminal device estimates the channel between the first network device, the IRS, and the terminal device, all array elements in the IRS are in a reflection disabled mode. When the terminal device estimates the channel between the first network device, the IRS, and the terminal device, the IRS enables array elements one by one, so that the array elements are in a reflection enabled mode. The terminal device estimates channels corresponding to a case in which array elements are enabled, and the terminal device combines the channels corresponding to the case in which all the array elements are enabled and then subtracts the channel that is between the first network device and the terminal device and that is first estimated, to obtain the channel between the first network device, the IRS, and the terminal device.

However, because there are hundreds of thousands of array elements in the IRS, when array elements are enabled one by one in a time division manner, huge pilot overheads and a high delay may be caused. In addition, when the channel between the first network device, the IRS, and the terminal device is estimated, only one array element in the IRS is enabled each time, and consequently an IRS array gain compensation path loss cannot be obtained. Therefore, a signal-to-noise ratio (signal-to-noise ratio, SNR) of estimation of the channel between the first network device, the IRS, and the terminal device is low, and precision is poor.

In view of this, this application provides a method with low pilot overheads, a low delay, and high precision to estimate a channel between a first network device, a second network device, and a terminal device.

The following describes in detail the method provided in embodiments of this application with reference to the accompanying drawings.

For ease of understanding of embodiments of this application, the following descriptions are first provided before embodiments of this application are described.

First, in embodiments of this application, "used to indicate" may include "used to directly indicate and "used to indirectly indicate", or may include "explicitly indicate" and "implicitly indicate". Information indicated by information is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, it may alternatively be agreed on in advance (for example, specified in a protocol) that the to-be-indicated information is to be indicated depending on whether an information element exists, thereby reducing indication overheads to some extent.

Second, the terms "first". "second", and various numbers in the following embodiments are merely used for differentiation for ease of description, and are not used to limit the scope of embodiments of this application. For example, the terms are used to distinguish between different time offset parameters and different information.

Third, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation, and do not mean any other limitation.

Fourth, the following describes a plurality of embodiments in detail with reference to a plurality of flowcharts. However, it should be understood that related descriptions of these flowcharts and embodiments corresponding to the flowcharts are merely examples for ease of understanding, and shall not constitute any limitation on this application. Each step in each flowchart is not necessarily mandatory, for example, some steps may be skipped. In addition, an execution sequence of steps is not fixed and is not limited to that shown in the figure. The execution sequence of the steps should be determined based on functions and internal logic of the steps.

Interaction between a first network device, a second network device, and a terminal device is used as an example in the embodiments shown below to describe in detail a method provided in embodiments of this application. However, this shall not constitute any limitation on this application. For example, the terminal device shown in the following embodiments may be replaced with a component (for example, a chip, a chip system, or a circuit) configured in the terminal device. The network device shown in the following embodiments may also be replaced with a component (for example, a chip, a chip system, or a circuit) configured in the network device.

The embodiments shown below do not specially limit a specific structure of an execution body of the method provided in embodiments of this application, provided that communication can be performed according to the method provided in embodiments of this application by running a program that records code of the method provided in embodiments of this application. For example, the method provided in embodiments of this application may be performed by a terminal device, a first network device, or a second network device, or a functional module that is in the terminal device, the first network device, or the second network device and that can invoke and execute the program.

Figure 4:
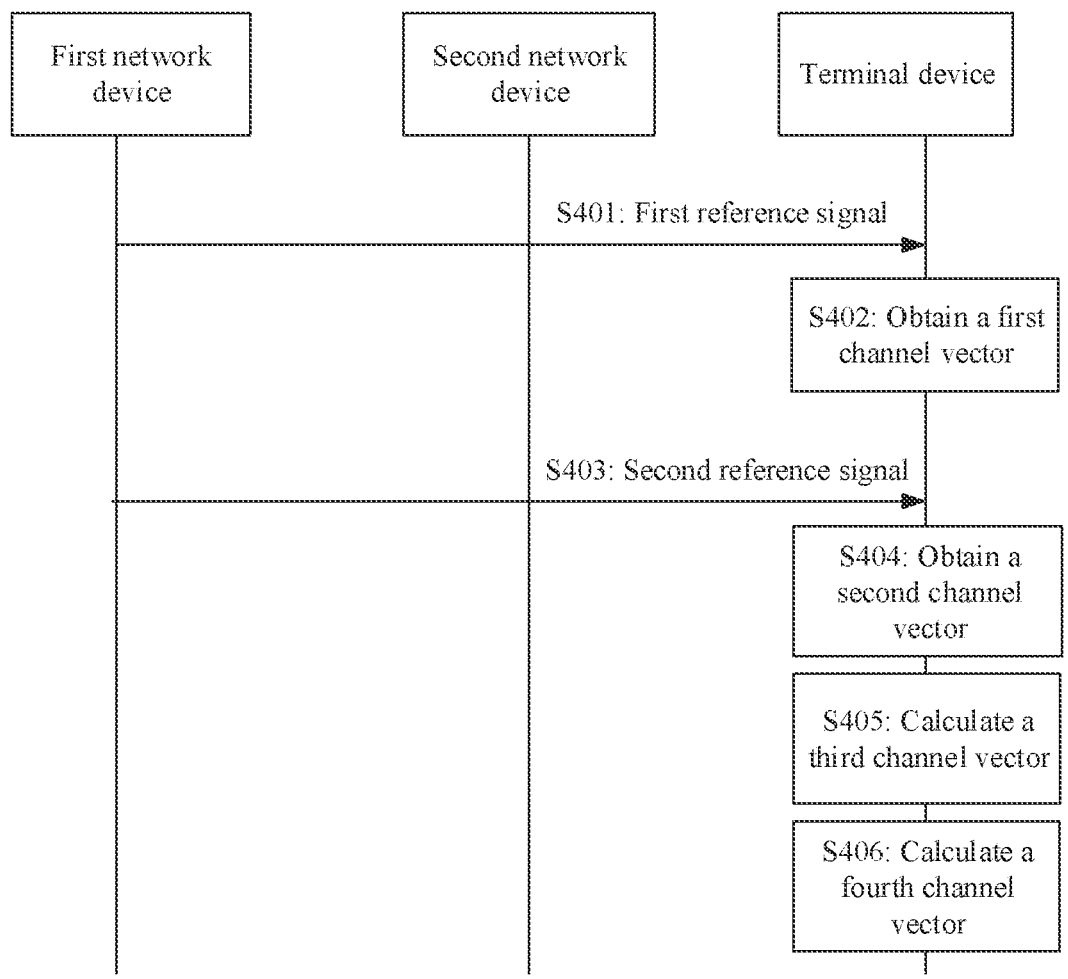
FIG. 4 is a schematic flowchart of a method according to an embodiment of this application.

FIG. 4 is a schematic flowchart of a method according to an embodiment of this application. As shown in FIG. 4, the method 400 includes S401 to S406. The steps are described in detail below.

S401: A first network device sends one or more first reference signals. Correspondingly, a terminal device receives the one or more first reference signals from the first network device on a $d^{th}$ port of the terminal device.

Herein, $d \in [1, D]$, D is a quantity of ports of the terminal device, and D is a positive integer.

A manner in which the first network device sends the first reference signal is not specifically limited in this embodiment of this application. For example, the first network device may send the first reference signal in a TDM manner. Alternatively, the first network device may send the first reference signal in an FDM manner. Alternatively, the first network device may send the first reference signal in a CDM manner.

The first reference signal sent by the first network device may be a reference signal precoded by the first network device based on a first precoding matrix.

A specific form of the first precoding matrix is not limited in this embodiment of this application. For example, the first precoding matrix may be a codeword in a Type I/II codebook in R15.

It may be understood that the terminal device may have one or more receive ports, and all receive ports of the terminal device receive the first reference signal.

S402: The terminal device obtains a first channel vector $h_{1,d}$ on the $d^{th}$ port of the terminal device based on the received first reference signal.

Herein, $h_{1,d}$ is a channel vector of a channel between the first network device and the $d^{th}$ port of the terminal device.

For a method in which the terminal device obtains the first channel vector $h_{1,d}$, refer to the conventional technology. For brevity, details are not described herein.

S403: The terminal device receives N second reference signals on the $d^{th}$ port of the terminal device.

Herein, N is a quantity of ports of the second reference signal, and N is an integer greater than or equal to 2. The quantity of ports of the second reference signal is less than a quantity of ports of a second network device.

It should be understood that each second reference signal is a reference signal generated by superimposing a first component and a second component. An $n^{th}$ first component corresponds to an $n^{th}$ third reference signal sent by the first network device, and an $n^{th}$ second component corresponds to an $n^{th}$ fourth reference signal sent by the second network device. The $n^{th}$ third reference signal is a reference signal precoded by the first network device based on the first precoding matrix, and the $n^{th}$ fourth reference signal is a reference signal generated after the second network device precodes the $n^{th}$ third reference signal based on a second precoding matrix, where $n \in [1, N]$.

It may be understood that the terminal device may have one or more receive ports, and all receive ports of the terminal device receive the second reference signal.

Optionally, the N second reference signals received by the terminal device are sent in a TDM manner.

It should be understood that, when the first network device sends the $n^{th}$ third reference signal, the $n^{th}$ third reference signal may be directly transmitted to the terminal device through a channel between the first network device and the terminal device, and may also be transmitted to the terminal device through a channel between the first network device, the second network device, and the terminal device. Therefore, an $n^{th}$ second reference signal received by the terminal device may be understood as a reference signal generated by superimposing the $n^{th}$ third reference signal directly from the first network device and the $n^{th}$ fourth reference signal directly from the second network device.

The second precoding matrix is used to process a fourth channel vector $h_{4,d}$ to obtain a third channel vector $h_{3,d}$. If a quantity of ports of the third channel vector $h_{3,d}$ is less than a quantity of ports of the fourth channel vector $h_{4,d}$, it may be further understood that the third channel vector $h_{3,d}$ has sparsity.

It should be understood that the second precoding matrix is used to process the fourth channel vector $h_{4,d}$, that is, perform spatial-domain compression on the fourth channel vector $h_{4,d}$, to obtain the third channel vector $h_{3,d}$ having sparsity.

Optionally, the second precoding matrix is $\theta_n (n=1, 2, \ldots, N)$, and is specifically represented as $\theta_n (n=1, 2, \ldots, N) = Vb_n (n=1, 2, \ldots, N)$. Herein, V is a matrix formed by a group of orthogonal bases, and $b_n (n=1, 2, \ldots, N)$ may be a Gaussian random distribution matrix, or $b_n (n=1, 2, \ldots, N)$ may be a Bernoulli random distribution matrix. A specific form of $b_n$ is not limited in this embodiment of this application.

A specific form of the first precoding matrix is not limited in this embodiment of this application. For example, the first precoding matrix may be a codeword in a Type I/II codebook in R15.

Optionally, the first precoding matrix is $w_n (n=1, 2, \ldots, N)$, and is specifically represented as $w_n (n=1, 2, \ldots, N) = Ua_n (n=1, 2, \ldots, N)$. Herein, U is a matrix formed by a group of orthogonal bases, and $a_n (n=1, 2, \ldots, N)$ may be a Gaussian random distribution matrix, or $a_n (n=1, 2, \ldots, N)$ may be a Bernoulli random distribution matrix. A specific form of $a_n (n=1, 2, \ldots, N)$ is not limited in this embodiment of this application.

The first precoding matrix may be used together with the second precoding matrix to process the fourth channel vector $h_{4,d}$.

A specific manner in which the terminal device obtains the first precoding matrix and the second precoding matrix is not limited in this embodiment of this application. For example, the first precoding matrix and the second precoding matrix may be calculated by the terminal device. Further, the terminal device sends the first precoding matrix and the second precoding matrix to the first network device. Further, the first network device sends the second precoding matrix to the second network device. For another example, the first precoding matrix and the second precoding matrix may be calculated by the first network device. Further, the first network device sends the first precoding matrix and the second precoding matrix to the terminal device. Further, the first network device sends the second precoding matrix to the second network device. For another example, the first precoding matrix and the second precoding matrix may be specified in a communications protocol.

S404: The terminal device obtains a second channel vector $h_{2,d}$ based on the N received second reference signals.

It should be understood that a sequence between a combination of S401 and S402 and a combination of S403 and S404 is not specifically limited in this embodiment of this application. S401 and S402 may be performed before or after S403 and S404.

S405: The terminal device calculates a third channel vector $h_{3,d}$ based on the obtained second channel vector $h_{2,d}$ and the obtained first channel vector $h_{1,d}$.

Optionally, the terminal device calculates the third channel vector $h_{3,d}$ according to a formula $h_{3,d} = h_{2,d} - [h_{1,d}w_1, h_{1,d}w_2, \ldots, h_{1,d}w_N]^T$.

S406: The terminal device calculates a fourth channel vector $h_{4,d}$ based on the third channel vector $h_{3,d}$.

Optionally, the terminal device obtains the fourth channel vector $h_{4,d}$ according to a formula $h_{3,d} = \Phi h_{4,d}$. Herein, $\Phi$ is a function $f(\theta_n(n=1, 2, \ldots, N), w_n(n=1, 2, \ldots, N))$ of the first precoding matrix and the second precoding matrix, and $\Phi$ is represented as $\Phi = [w_1^T \otimes \theta_1^T, w_2^T \otimes \theta_2^T, \ldots, w_N^T \otimes \theta_N^T]^T$.

It should be understood that the fourth channel vector $h_{4,d}$ has sparsity after spatial-domain compression is performed on the fourth channel vector by using the second precoding matrix or by using the first precoding matrix together with the second precoding matrix. Therefore, the terminal device may calculate the fourth channel vector $h_{4,d}$ by using a compressed sensing algorithm or an artificial intelligence algorithm.

Optionally, after the terminal device calculates the fourth channel vector $h_{4,d}$ and obtains the first channel vector $h_{1,d}$, the terminal device may jointly obtain the third precoding matrix $\overline{w}$ and the fourth precoding matrix $\overline{\theta}$ based on the fourth channel vector $h_{4,d}$ and the first channel vector $h_{1,d}$, and then send the third precoding matrix $\overline{w}$ and the fourth precoding matrix $\overline{\theta}$ to the first network device. Further, the first network device sends the received fourth precoding matrix $\overline{\theta}$ to the second network device. The third precoding matrix $\overline{w}$ is a precoding matrix used when the first network device transmits data to the terminal device, and the fourth precoding matrix $\overline{\theta}$ is a precoding matrix used when the second network device transmits data to the terminal device.

A specific manner in which the first network device sends the fourth precoding matrix $\overline{\theta}$ is not limited in this embodiment of this application. For example, the first network device sends the fourth precoding matrix $\overline{\theta}$ to the second network device by using wireless transmission dynamic signaling. Alternatively, the first network device sends the fourth precoding matrix $\overline{\theta}$ to the second network device by using RRC signaling. Alternatively, the first network device sends the fourth precoding matrix $\overline{\theta}$ to the second network device by using a wired transmission control signal.

Optionally, the terminal device iterates the following two processes by using a first indicator as an optimization target until the optimization target is no longer added: (1) fixing the third precoding matrix $\overline{w}$ and calculating the fourth precoding matrix $\overline{\theta}$; and (2) fixing the fourth precoding matrix $\overline{\theta}$ and calculating the third precoding matrix $\overline{w}$.

The first indicator includes one or more of the following: spectrum efficiency, energy efficiency, a transmission rate, and an error between the first indicator and a target transmission solution. If the first indicator is the spectrum efficiency, the energy efficiency, or the transmission rate, the optimization target is to maximize the first indicator. If the first indicator is the error between the first indicator and the target transmission solution, the optimization target is to minimize the first indicator, and the target transmission solution is an optimal transmission solution between the first network device, the second network device, and the terminal device.

$\overline{\theta}$ is $\exp(-j(\arg(h_{1,d}\overline{w}) - \arg(H_{4,d}\overline{w})))$, where $\text{vec}(H_{4,d}) = h_{4,d}$, and $\arg(.)$ represents a phase extraction operation.

$\overline{w}$ is $$\alpha \frac{(h_{1,d}^H + \overline{\theta}^H H_{4,d})^H}{\|h_{1,d}^H + \overline{\theta}^H H_{4,d}\|_2},$$

where $\text{vec}(H_{4,d}) = h_{4,d}$, and $\alpha$ is a non-zero constant.

Optionally, after the terminal device calculates the fourth channel vector $h_{4,d}$ and obtains the first channel vector $h_{1,d}$, the terminal device sends the fourth channel vector $h_{4,d}$ and the first channel vector $h_{1,d}$ to the first network device. The first network device jointly obtains the third precoding matrix $\overline{w}$ and the fourth precoding matrix $\overline{\theta}$ based on the received fourth channel vector $h_{4,d}$ and the received first channel vector $h_{1,d}$. Further, the first network device sends the fourth precoding matrix $\overline{\theta}$ to the second network device.

A process in which the first network device jointly obtains the third precoding matrix $\overline{w}$ and the fourth precoding matrix $\overline{\theta}$ based on the received fourth channel vector $h_{4,d}$ and the received first channel vector $h_{1,d}$ is described above. For brevity, details are not described herein again.

Figure 5A:
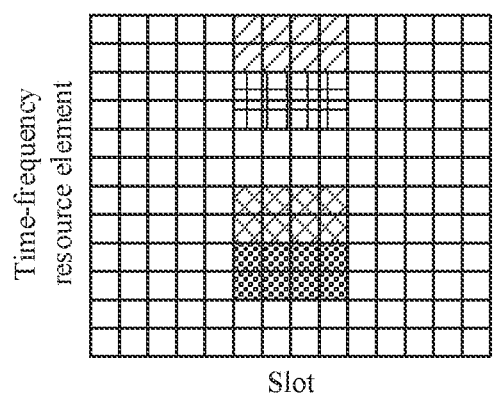
FIG. 5(a) and FIG. 5(b) are a schematic diagram of resource mapping.
Figure 5B:
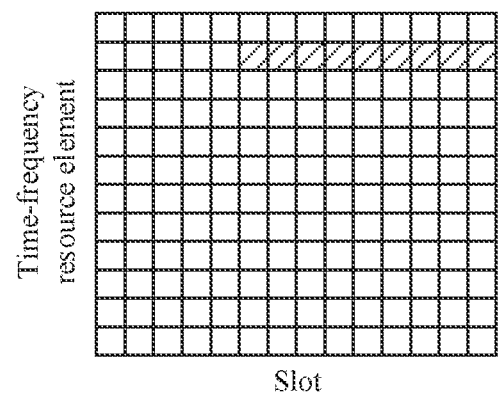

As described above, in a process in which the terminal device obtains the first channel vector $h_{1,d}$, the first network device may send the first reference signal through different ports in a TDM manner, in an FDM manner, or in a CDM manner. As shown in FIG. 5(a), the first network device sends the first reference signal through different ports on different time-frequency resource elements in a same slot. However, in a process in which the terminal device calculates the fourth channel vector $h_{4,d}$, the first network device sends the third reference signal in a TDM manner. As shown in FIG. 5(b), the first network device sends the third reference signal through different ports in different slots on a same time-frequency resource element. Therefore, in a process in which the terminal device calculates the first channel vector $h_{1,d}$, a quantity of time-frequency resource elements (resource elements, REs) occupied by the first reference signal needs to be greater than or equal to a quantity of ports of the first network device. In a process in which the terminal device calculates the fourth channel vector $h_{4,d}$, a quantity of REs occupied when the second network device generates a fourth reference signal based on the third reference signal from the first network device, and sends the fourth reference signal to the terminal device is far less than a quantity of ports of the second network device.

In this embodiment of this application, the second precoding matrix that has a spatial-domain compression function is designed to perform spatial-domain compression on the fourth channel vector $h_{4,d}$ to obtain sparsity, to estimate $h_{4,d}$ with a large quantity of ports based on $h_{3,d}$ with a small quantity of ports. Therefore, in the method provided in this embodiment of this application, sparsity of the fourth channel vector $h_{4,d}$ in space domain can be fully mined to reduce pilot overheads and a delay. In addition, all array gains of the second network device can be further obtained to improve an SNR and estimation precision of channel estimation.

In addition, the first precoding matrix that has a spatial-domain compression function is further designed in this embodiment of this application. Therefore, sparsity of the fourth channel vector $h_{4,d}$ in space domain can be further mined to reduce pilot overheads and a delay of channel estimation.

The following further describes the foregoing method by using an example in which the second network device is an IRS.

It should be understood that, in the following embodiments, for ease of understanding and description, the method provided in this embodiment of this application is described in detail by using an example in which M ports are configured for the first network device, T ports are configured for the IRS, and one antenna is configured for the terminal device. Herein, M is a positive integer greater than or equal to 1, and T is a positive integer greater than or equal to 1. However, this shall not constitute any limitation on this application. The method provided in this embodiment of this application is also applicable to a scenario in which there are a plurality of terminal devices or a plurality of antennas are configured for the terminal device.

Figure 6:
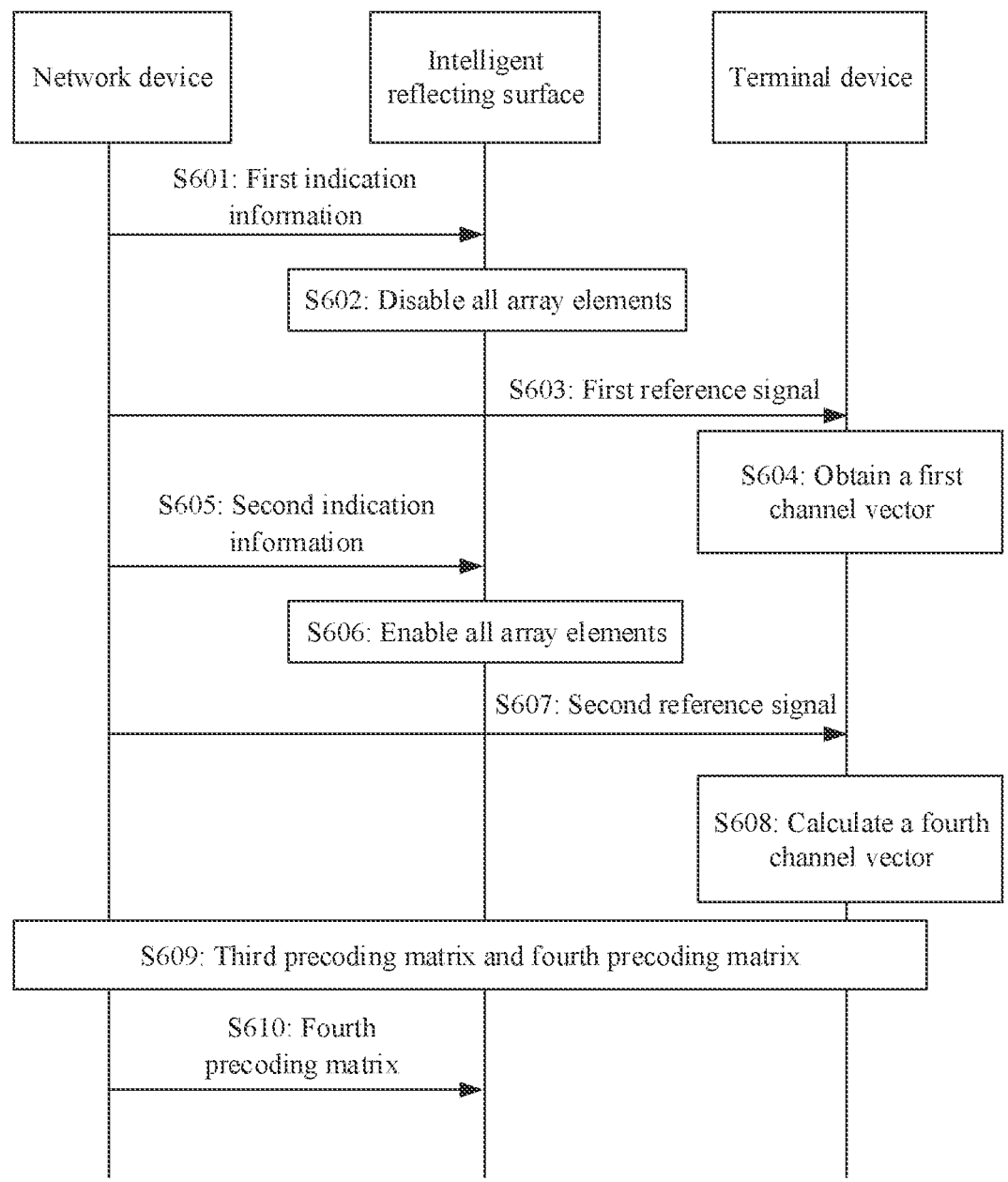
FIG. 6 is a schematic flowchart of a method according to another embodiment of this application.

FIG. 6 is a schematic flowchart of a method according to another embodiment of this application. As shown in FIG. 6, the method 600 includes S601 to S610. The steps are described in detail below.

S601: A first network device sends first indication information to an IRS. Correspondingly, the IRS receives the first indication information from the network device.

The first indication information is used to indicate the IRS to disable all array elements.

S602: The IRS disables all array elements based on the first indication information, so that all the array elements are in a reflection disabled mode.

S603: The network device sends a first reference signal to a terminal device.

The first reference signal is used to obtain a first channel vector $h_{1,d}$.

S604: The terminal device obtains the first channel vector $h_3$.

For a method in which the terminal device obtains the first channel vector $h_{1,d}$, refer to the conventional technology. For brevity, details are not described herein.

S605: The network device sends second indication information to the IRS. Correspondingly, the IRS receives the second indication information from the network device.

The second indication information is used to indicate the IRS to enable all array elements.

S606: The IRS enables all array elements based on the second indication information, so that all the array elements are in a reflection enabled mode.

S607: The terminal device receives a second reference signal.

The second reference signal is used to obtain a second channel vector $h_{2,d}$.

S608: The terminal device calculates a fourth channel vector $h_{4,d}$.

As described above, the terminal device calculates the fourth channel vector $h_{4,d}$ based on the N received second reference signals.

For example, an $n^{th}$ third reference signal used to generate an $n^{th}$ second reference signal through superimposition may be represented as $h_{1,d}w_n x_n$, where $w_n \in \mathbb{C}^M$ is a first precoding matrix, and $w_n$ meets a transmit power limitation condition: $tr(w_n w_n^H)=P$, where P is transmit power of the first network device, and $x_n \in \mathbb{C}^M$ is a reference signal that is not precoded.

An $n^{th}$ fourth reference signal generated after the IRS receives the $n^{th}$ third reference signal from the first network device, and precodes the $n^{th}$ third reference signal based on a second precoding matrix may be represented as $h_r^H \Theta_n G_r^H w_n x_n$, where $G_r^H \in \mathbb{C}^{T \times M}$ represents a downlink channel vector from the first network device to the IRS, $h_r^H \in \mathbb{C}^{1 \times T}$ represents a downlink channel vector from the IRS to the terminal device, $\Theta_n = \text{diag}(\theta_1, \theta_2, \ldots, \theta_T)$ is the second precoding matrix, $\theta_l$ is an amplitude and phase modulation coefficient on an $l^{th}$ array element in the IRS, $l \in [1,T]$, T is a quantity of ports of the IRS, and T is a positive integer.

Therefore, the $n^{th}$ second reference signal $y_n \in \mathbb{C}$ received by the terminal device may be represented as follows:

$$y_n = (h_{1,d} + h_r^H \Theta_n G_r^H) w_n x_n + k_n \qquad (1)$$

Herein, $k_n \sim \mathcal{CN}(0,\sigma^2)$ is complex white Gaussian noise, and $\sigma^2$ is noise power.

Because $\Theta_n = \text{diag}(\theta_1, \theta_2, \ldots, \theta_T)$, the $n^{th}$ second reference signal $y_n \in \mathbb{C}$ received by the terminal device may be further represented as follows:

$$y_n = (h_{1,d} + \theta_n^H \text{diag}(h_r^H) G_r^H) w_n x_n \qquad (2)$$

Herein, $\theta_n = [\theta_1, \theta_2, \ldots, \theta_T]^H \in \mathbb{C}^T$, and $\theta_n$ is equivalent to $\Theta_n$, that is, $\theta_n$ is the second precoding matrix.

The terminal device may directly obtain the second channel vector $h_{2,d} = [y_1, y_2, \ldots, y_N]T$ based on the N received second reference signals $y_n \in \mathbb{C}$.

It should be understood that, for a method for estimating $h_{1,d}$ in Formula (2), refer to the conventional technology. For brevity, details are not described herein.

Formula (2) may mean that the first precoding matrix and the second precoding matrix are performed on each channel vector. It may be understood that y, $\theta_n$, $h_{1,d}$, and $w_n$ in Formula (2) are known to the terminal device. Therefore, the terminal device may calculate an equivalent matrix $H_4 = \text{diag}(h_r^H) G_r^H$ of the fourth channel vector $h_{4,d}$ based on the first channel vector $h_{1,d}$ and the second channel vector $h_{2,d}$.

Because both a quantity M of ports of the first network device and the quantity T of ports of the IRS are large, and a dimension of $H_4 = \text{diag}(h_r^H) G_r^H \in \mathbb{C}^{T \times M}$ is large, a conventional channel estimation solution causes very high pilot overheads and a very high delay. In view of this, in this embodiment of this application, potential sparsity of the fourth channel vector $h_{4,d}$ in space domain is fully used, and then the fourth channel vector $h_{4,d}$ is calculated by solving an underdetermined equation $h_{3,d} = \Phi h_{4,d}$, to reduce pilot overheads.

A specific form of the first precoding matrix is not limited in this embodiment of this application. For example, the first precoding matrix may be designed as $w_n(n=1, 2, \ldots, N) = U a_n(n=1, 2, \ldots, N)$. Herein, $U \in \mathbb{C}^{M \times M}$ is a matrix formed by a group of orthogonal bases, that is, a discrete Fourier transform (discrete Fourier transform, DFT) matrix, which can implement spatial-domain compression on each column of $H_4$, and $a_n \in \mathbb{C}^M$ is a null space projection vector of the first channel vector $h_{1,d}$, that is, satisfies $h_{1,d} w_n = h_{1,d} U a_n = 0$ and $\theta_n^H H_4 U a_n \neq 0$.

Further, in this embodiment of this application, the second precoding matrix is designed as a spatial-domain compression-based beam codebook $\mathcal{B}$, and is represented as follows:

$$\mathcal{B} = \{\theta_n | \theta_n = V b_n, n = 1, 2, \ldots, N\} \qquad (3)$$

Herein, $v \in \mathbb{C}^{T \times T}$ is a DFT matrix, which can implement spatial-domain compression on each row of the channel matrix $H_4$, and $b_n \in \mathbb{C}^{N \times 1}$ is a sampling vector. A specific form of $b_n$ is not limited in this embodiment of this application. For example, according to a compressed sensing theory, $b_n$ may be a Bernoulli random vector, that is, each element of $b_n$ is randomly selected from a set {+1,−1} with an equal probability.

Figure 7:
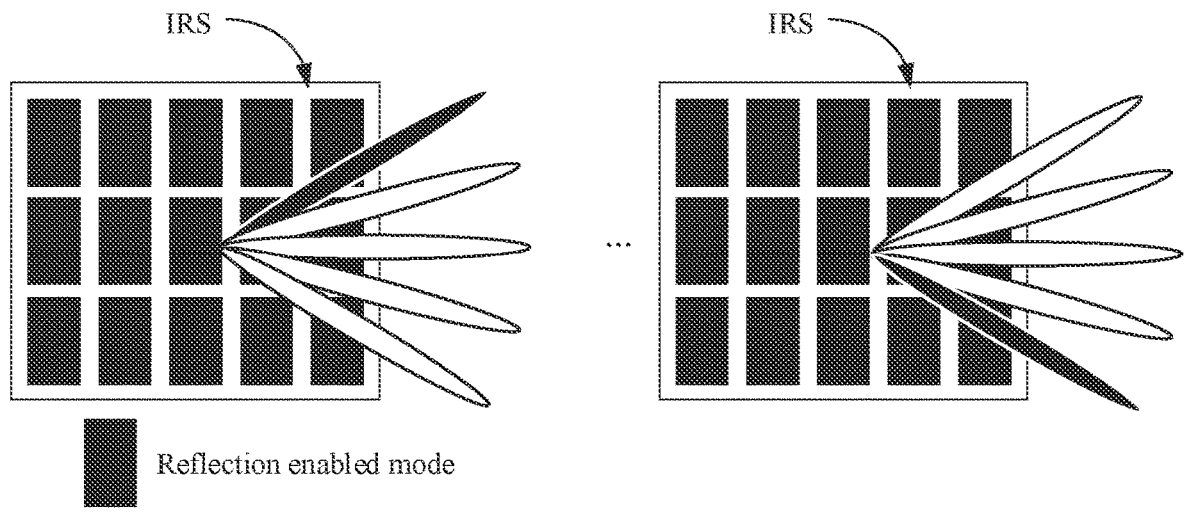
FIG. 7 is a schematic diagram in which an intelligent reflecting surface generates codewords in a beam codebook one by one.

As shown in FIG. 7, each time the first network device sends the third reference signal in a TDM manner, the IRS in a reflection enabled mode selects one codeword from the beam codebook $\mathcal{B}$, that is, selects one second precoding matrix $\theta_n$. After the first network device sends the third reference signal for N times, the N second reference signals received by the terminal device may be represented as follows:

$$h_{2,d} = \begin{bmatrix} y_1 \\ y_2 \\ \vdots \\ y_N \end{bmatrix} \quad (4)$$

$$= \begin{bmatrix} h_{1,d}w_1 \\ h_{1,d}w_2 \\ \vdots \\ h_{1,d}w_N \end{bmatrix} + \begin{bmatrix} w_1^T \otimes \theta_1^H \\ w_2^T \otimes \theta_2^H \\ \vdots \\ w_N^T \otimes \theta_N^H \end{bmatrix} vec(H_4) + \begin{bmatrix} k_1 \\ k_2 \\ \vdots \\ k_N \end{bmatrix}$$

$$= \begin{bmatrix} h_{1,d}w_1 \\ h_{1,d}w_2 \\ \vdots \\ h_{1,d}w_N \end{bmatrix} + \Phi h_{4,d} + k,$$

In this embodiment of this application, a relationship $vec(ABC)=(C^T \otimes A)vec(B)$ is used, and it is assumed that $x_n=1$, and $\Phi=[w_1^T \otimes \theta_1^H, w_2^T \otimes \theta_2^H, \ldots, w_N^T \otimes \theta_N^H]^T$, $h_{4,d}=vec(H_4)$, and $k=[k_1, k_2, \ldots, k_N]^T$ are defined. Then, the terminal device may obtain $h_{3,d}$ based on $h_{1,d}$ and $h_{2,d}$, which is represented as follows:

$$h_{3,d} = h_{2,d} - \begin{bmatrix} h_{1,d}w_1 \\ h_{1,d}w_2 \\ \vdots \\ h_{1,d}w_N \end{bmatrix} \quad (5)$$

$$= \Phi h_{4,d} + k$$

$$= \begin{bmatrix} a_1^T \otimes b_1^H \\ a_2^T \otimes b_2^H \\ \vdots \\ a_N^T \otimes b_N^H \end{bmatrix} vec(V^H H_4 U) + k,$$

Herein, $$h_s \triangleq vec(V^H H_4 U)$$

has obvious sparsity, $$\Phi \triangleq [a_1^T \otimes b_1^H, a_2^T \otimes b_2^H, \cdots, a_N^T \otimes b_N^H]^T,$$

and N<<T. Therefore, Formula (5) may be considered to resolve a classical sparse signal reconstruction problem. Many classical compressed sensing algorithms may be used to solve $h_s$, and then $h_{4,d}=vec(H_4)$ is recovered based on the relationship $h_s \triangleq vec(V^H H_4 U)$.

A specific compressed sensing algorithm to be used to solve Formula (5) is not limited in this embodiment of this application. For example, a learned approximate message passing (learned approximate message passing, LAMP) algorithm may be used. An essential idea of the LAMP algorithm is based on an iterative framework of a classical approximate message passing (approximate message passing, AMP) algorithm, and a neural network is used to learn an optimal iterative operation process, to avoid a performance loss caused by selecting a parameter such as a correction factor based on experience in the conventional AMP algorithm.

For example, a $(t+1)^{th}$ time of iterative process of the LAMP algorithm includes the following two steps:

$$\hat{h}_{t+1} = \beta_t \eta_{st}\left(\hat{h}_t + Av_t; \frac{\alpha_t}{\sqrt{M}}\|v_t\|_2\right) \quad (6)$$

$$v_{t+1} = y - \Psi \hat{h}_{t+1} + \frac{\beta_t}{P}\|\hat{h}_{t+1}\|_0 v_t \quad (7)$$

Herein, $\hat{h}_{t+1}$ is an estimate of a $(t+1)^{th}$ time of iterative sparse vector h, and $\hat{h}_0=0$; $v_{t+1}$ is a $(t+1)^{th}$ time of iterative residual vector, and $v_0=y$; and $\eta_{st}(\cdot)$ is a contraction function, and is defined as follows:

$$[\eta_{st}(r; \lambda)]_j \triangleq sgn(r_j)max\{|r_j| - \lambda, 0\} \quad (8)$$

Finally, $\Xi=\{A, \{\alpha_t, \beta_t\}_{t=0}^{T-1}\}$ is a set of correction factors, and is obtained through learning by using a neural network. Specifically, the terminal device first generates S pieces of sample data $\{h_{3,d}^s, h_{4,d}^s\}_{s=1}^S$ offline through simulation, and $A=\Psi^H$, $\alpha_0=1$, $\beta_0=1$. Then, the terminal device uses a neural network to learn optimal $\Xi$ by using an objective of minimizing an estimated normalized mean square error. The normalized mean square error is defined as follows:

$$\frac{1}{S}\sum_{s=1}^{S}\left\|\hat{h}_T\left(h_{3,d}^s; \{A, \{\alpha_t, \beta_t\}_{t=0}^{T-1}\}\right) - h_{4,d}^s\right\|_2^2 \quad (9)$$

S609: Jointly obtain the third precoding matrix and the fourth precoding matrix.

In an implementation, S609 is performed by the terminal device. In this case, the terminal device reports the fourth channel vector $h_{4,d}$ and the first channel vector $h_{1,d}$ to the first network device in an implicit feedback manner. To be specific, the terminal device first jointly obtains the third precoding matrix $\overline{w}$ and the fourth precoding matrix $\overline{\theta}$ based on the fourth channel vector $h_{4,d}$ and the first channel vector $h_{1,d}$, and then sends the third precoding matrix $\overline{w}$ and the fourth precoding matrix $\overline{\theta}$ to the first network device. Because the terminal device feeds back only the third precoding matrix $\overline{w}$ and the fourth precoding matrix $\overline{\theta}$, implicit feedback has low feedback overheads. However, because the terminal device cannot learn of a channel of another terminal device, an optimization result of implicit feedback usually causes heavy interference, and therefore implicit feedback is more applicable to a single-user scenario.

In another implementation, S609 is performed by the first network device. In this case, the terminal device reports the fourth channel vector $h_{4,d}$ and the first channel vector $h_{1,d}$ in an explicit feedback manner. The terminal device reports the fourth channel vector $h_{4,d}$ and the first channel vector $h_{1,d}$ to the first network device. The first network device jointly obtains the third precoding matrix $\overline{w}$ and the fourth precoding matrix $\overline{\theta}$ based on the received fourth channel vector $h_{4,d}$ and the received first channel vector $h_{1,d}$. Because the terminal device needs to feed back high-dimensional channel information, explicit feedback has high feedback overheads. However, because the first network device has channel information of all terminal devices, explicit feedback can effectively eliminate multi-user interference, and therefore is more applicable to a multi-user scenario.

A specific manner in which the terminal device or the first network device jointly obtains the third precoding matrix $\overline{w}$ and the fourth precoding matrix $\overline{\theta}$ is not limited in this embodiment of this application. For example, the terminal device or the first network device may iterate the following two processes by using a first indicator as an optimization target until the optimization target is no longer added: (1) fixing the third precoding matrix $\overline{w}$ and calculating the fourth precoding matrix $\overline{\theta}$; and (2) fixing the fourth precoding matrix $\overline{\theta}$ and calculating the third precoding matrix $\overline{w}$. The first indicator includes one or more of the following: spectrum efficiency, energy efficiency, a transmission rate, and an error between the first indicator and a target transmission solution. If the first indicator is the spectrum efficiency, the energy efficiency, or the transmission rate, the optimization target is to maximize the first indicator. If the first indicator is the error between the first indicator and the target transmission solution, the optimization target is to minimize the first indicator, and the target transmission solution is an optimal transmission solution between the first network device, the second network device, and the terminal device.

An essential idea is to optimize another precoding matrix by fixing a precoding matrix, and perform alternate iteration until convergence, so that an unsolvable non-convex optimization problem can be transformed into a solvable optimization subproblem.

In this embodiment of this application, in a single-port single-user scenario, a process of obtaining the third precoding matrix $\overline{w}$ and the fourth precoding matrix $\overline{\theta} = \text{diag}(\Theta)$ is described in detail by using an example in which a transmission rate of a system is maximized. However, this shall not constitute a limitation on this embodiment of this application. This embodiment of this application is also applicable to a multi-user scenario, and is also applicable to a scenario in which spectrum efficiency, energy efficiency, or the like is maximized as an optimization target.

In the single-user scenario, an optimization problem of the transmission rate of the system may be represented as follows:

$$\max_{\overline{w},\overline{\theta}} \|(h_{1,d} + h_r^H \Theta G_r^H)\overline{w}\|_2^2 \quad (10)$$

$$\text{s.t. } \|\overline{w}\|_2^2 \leq P$$

$$0 \leq \theta_n \leq 2\pi, \forall n = 1, 2, \cdots, N$$

A second constraint condition of the foregoing optimization problem is non-convex, and therefore the problem cannot be directly solved. Therefore, in this embodiment of this application, a suboptimal solution of the problem may be obtained in such a manner of fixing the third precoding matrix $\overline{w}$, calculating the fourth precoding matrix $\overline{\theta}$, fixing the fourth precoding matrix $\overline{\theta}$, and calculating the third precoding matrix $\overline{w}$. When $\overline{\theta}$ is fixed, the foregoing problem is convex, and optimal $\overline{w}$ may be directly obtained through maximum ratio combining and is represented as follows:

$$\overline{w} = \alpha \frac{(h_{1,d}^H + \overline{\theta}^H H_{4,d})^H}{\|h_{1,d}^H + \overline{\theta}^H H_{4,d}\|_2} \quad (11)$$

Herein, $\text{vec}(H_{4,d}) = h_{4,d}$, and $\alpha$ is a non-zero constant.

Conversely, when $\overline{w}$ is fixed, optimal $\overline{\theta}$ may be obtained by using a triangle theorem, that is, an objective function is maximal only if phases of $h_{1,d}\overline{w}$ and $\overline{\theta}^H H_{4,d}\overline{w}$ are the same. In this case, optimal $\overline{\theta}$ may be represented as follows:

$$\exp(-j(\arg(h_{1,d}\overline{w}) - \arg(H_{4,d}\overline{w}))) \quad (12)$$

Herein, $\arg(.)$ represents a phase extraction operation. Optimal $\overline{\theta}$ and optimal $\overline{w}$ may be obtained by repeatedly calculating Formulas (11) and (12) until an objective function in Formula (10) is no longer increased.

Figure 8:
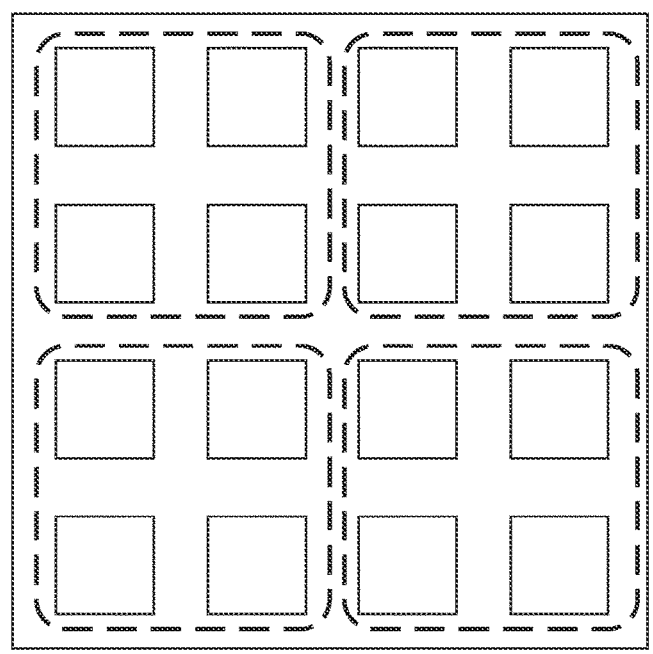
FIG. 8 is a schematic diagram of a grouping manner of an array element in an intelligent reflecting surface according to an embodiment of this application.

It should be understood that, in an actual system, network device precoding and IRS precoding may be selected from a codebook, for example, a Type I/II codebook in R15. To be compatible with an actual system, after the optimal fourth precoding matrix $\overline{\theta}$ and the optimal third precoding matrix $\overline{w}$ are obtained, in this embodiment of this application, a codeword that is closest to an optimization result (with a minimum Euclidean distance) may be selected from a correlated codebook as actual network device precoding and IRS precoding, and is reported in a manner of reporting the Type I/II codebook. Further, considering that a dimension of IRS precoding is large, conventional reporting may cause high feedback overheads. In this embodiment of this application, array elements of the IRS may be grouped. As shown in FIG. 8, for different array elements in a same group, in this embodiment of this application, only one amplitude and phase modulation factor is fed back, and a small performance loss is exchanged for a reduction in feedback overheads.

S610: The first network device sends the fourth precoding matrix $\overline{\theta}$ to the IRS.

A specific manner in which the first network device sends the fourth precoding matrix $\overline{\theta}$ is not limited in this embodiment of this application. For example, the first network device sends the fourth precoding matrix $\overline{\theta}$ to the IRS by using wireless transmission dynamic signaling. Alternatively, the first network device sends the fourth precoding matrix $\overline{\theta}$ to the IRS by using RRC signaling. Alternatively, the first network device sends the fourth precoding matrix to the IRS by using a wired transmission control signal.

In this embodiment of this application, the simulation result indicates that when P/N=1/8, 95% of the transmission rate in an ideal channel can be obtained in this embodiment of this application. Pilot overheads of the conventional solution are N. This indicates that the pilot overheads can be reduced by more than 87.5% in this embodiment of this application.

The foregoing describes in detail the methods provided in the embodiments of this application with reference to FIG. 4 to FIG. 8. The following describes in detail apparatuses provided in embodiments of this application with reference to FIG. 9 to FIG. 11.

Figure 9:
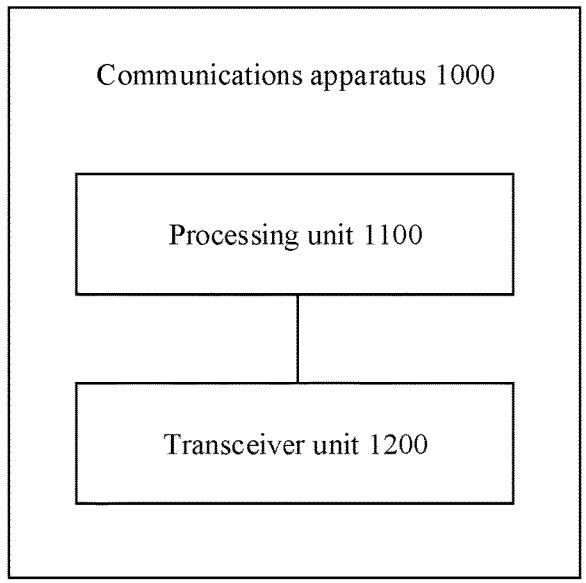
FIG. 9 is a schematic block diagram of a communications apparatus according to an embodiment of this application.

FIG. 9 is a schematic block diagram of a communications apparatus according to an embodiment of this application. As shown in FIG. 9, a communications apparatus 1000 may include a processing unit 1100 and a transceiver unit 1200.

In a possible design, the communications apparatus 1000 may correspond to the terminal device in the foregoing method embodiment, for example, may be a terminal device, or a component (for example, a chip or a chip system) configured in the terminal device.

It should be understood that the communications apparatus 1000 may correspond to the terminal device in the method 400 and the method 600 according to embodiments of this application. The communications apparatus 1000 may include units configured to perform the methods performed by the terminal device in the method 400 in FIG. 4 and the method 600 in FIG. 6. In addition, the units in the communications apparatus 1000 and the foregoing other operations and/or functions are separately used to implement corresponding procedures of the method 400 in FIG. 4 and the method 600 in FIG. 6.

When the communications apparatus 1000 is configured to perform the method 400 in FIG. 4, the processing unit 1100 may be configured to perform S402 and S404 to S406 in the method 400, and the transceiver unit 1200 may be configured to perform S401 and S403 in the method 400. It should be understood that, specific processes in which the units perform the foregoing corresponding steps have been described in detail in the foregoing method embodiments. For brevity, details are not described herein again.

When the communications apparatus 1000 is configured to perform the method 600 in FIG. 6, the processing unit 1100 may be configured to perform S602, S608, and S609 in the method 600, and the transceiver unit 1200 may be configured to perform steps S603, S607, and S609 in the method 600. It should be understood that, specific processes in which the units perform the foregoing corresponding steps have been described in detail in the foregoing method embodiments. For brevity, details are not described herein again.

Figure 10:
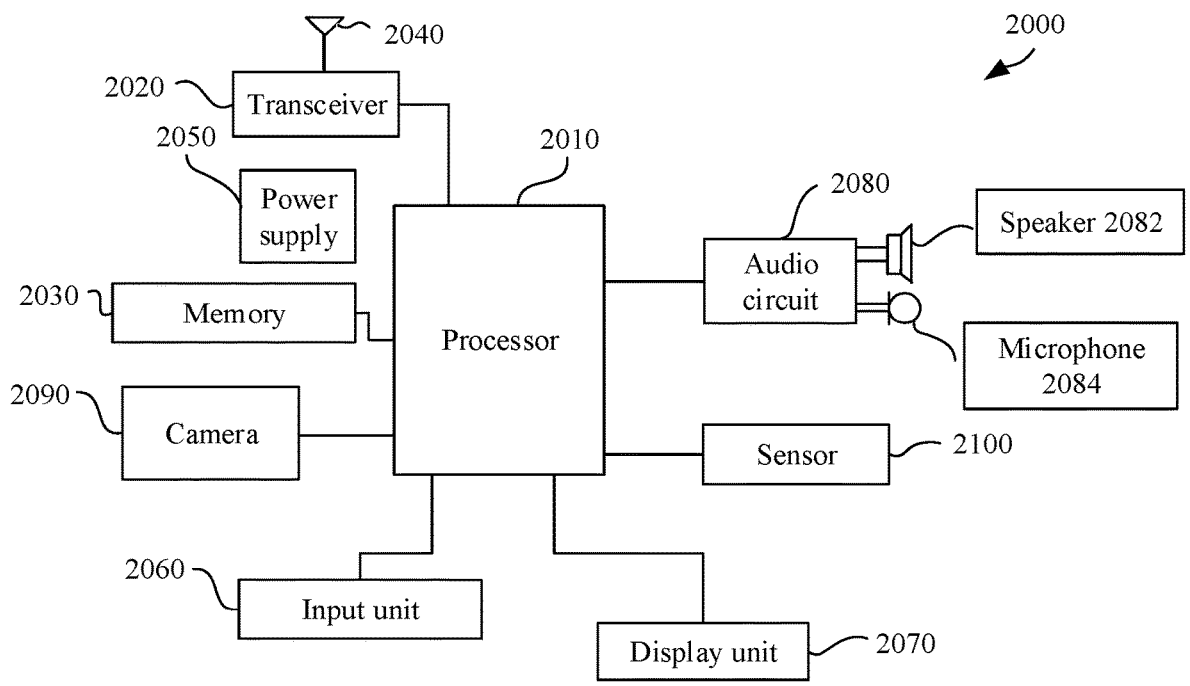
FIG. 10 is a schematic diagram of a structure of a terminal device according to an embodiment of this application.

It should be further understood that, when the communications apparatus 1000 is the terminal device, the transceiver unit 1200 in the communications apparatus 1000 may be implemented by a transceiver, for example, may correspond to a transceiver 2020 in a terminal device 2000 shown in FIG. 10, and the processing unit 1100 in the communications apparatus 1000 may be implemented by at least one processor, for example, may correspond to a processor 2010 in the terminal device 2000 shown in FIG. 10.

It should be further understood that, when the communications apparatus 1000 is a chip or a chip system configured in a terminal device, the transceiver unit 1200 in the communications apparatus 1000 may be implemented by using an input/output interface, and the processing unit 1100 in the communications apparatus 1000 may be implemented by using a processor, a microprocessor, an integrated circuit, or the like integrated into the chip or the chip system.

In another possible design, the communications apparatus 1000 may correspond to the first network device in the foregoing method embodiment, for example, may be a first network device, or a component (for example, a chip or a chip system) configured in the first network device.

It should be understood that the communications apparatus 1000 may correspond to the first network device in the method 400 and the method 600 according to embodiments of this application. The communications apparatus 1000 may include units configured to perform the methods performed by the first network device in the method 400 in FIG. 4 and the method 600 in FIG. 6. In addition, the units in the communications apparatus 1000 and the foregoing other operations and/or functions are separately used to implement corresponding procedures of the method 400 in FIG. 4 and the method 600 in FIG. 6.

When the communications apparatus 1000 is configured to perform the method 400 in FIG. 4, the processing unit 1100 may be configured to perform S401 and S403 in the method 400, and the transceiver unit 1200 may be configured to perform S401 and S403 in the method 400. It should be understood that, specific processes in which the units perform the foregoing corresponding steps have been described in detail in the foregoing method embodiments. For brevity, details are not described herein again.

When the communications apparatus 1000 is configured to perform the method 600 in FIG. 6, the processing unit 1100 may be configured to perform S609 in the method 600, and the transceiver unit 1200 may be configured to perform steps S601, S603, S605, S607, and S610 in the method 600. It should be understood that, specific processes in which the units perform the foregoing corresponding steps have been described in detail in the foregoing method embodiments. For brevity, details are not described herein again.

Figure 11:
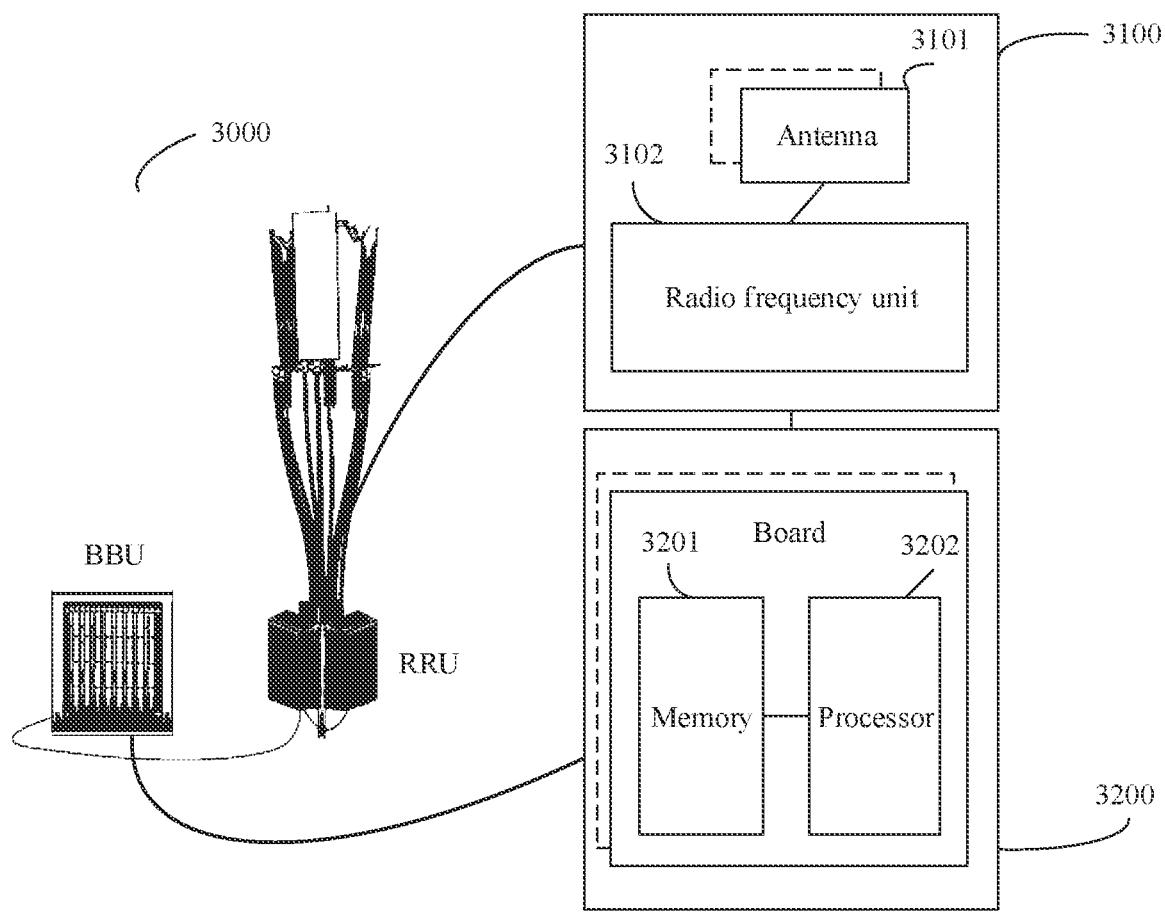
FIG. 11 is a schematic diagram of a structure of a network device according to an embodiment of this application.

It should be further understood that, when the communications apparatus 1000 is the first network device, the transceiver unit 1200 in the communications apparatus 1000 may be implemented by a transceiver, for example, may correspond to a transceiver 3100 in a network device 3000 shown in FIG. 11, and the processing unit 1100 in the communications apparatus 1000 may be implemented by at least one processor, for example, may correspond to a processor 3200 in the network device 3000 shown in FIG. 11.

It should be further understood that, when the communications apparatus 1000 is a chip or a chip system configured in a first network device, the transceiver unit 1200 in the communications apparatus 1000 may be implemented by using an input/output interface, and the processing unit 1100 in the communications apparatus 1000 may be implemented by using a processor, a microprocessor, an integrated circuit, or the like integrated into the chip or the chip system.

In another possible design, the communications apparatus 1000 may correspond to the second network device in the foregoing method embodiment, for example, may be a second network device, or a component (for example, a chip or a chip system) configured in the second network device.

It should be understood that the communications apparatus 1000 may correspond to the second network device in the method 400 according to this embodiment of this application. The communications apparatus 1000 may include units configured to perform the method performed by the second network device in the method 400 in FIG. 4. In addition, the units in the communications apparatus 1000 and the foregoing other operations and/or functions are separately used to implement corresponding procedures of the method 400 in FIG. 4.

When the communications apparatus 1000 is configured to perform the method 400 in FIG. 4, the processing unit 1100 may be configured to perform S403 in the method 400, and the transceiver unit 1200 may be configured to perform S403 in the method 400. It should be understood that, specific processes in which the units perform the foregoing corresponding steps have been described in detail in the foregoing method embodiments. For brevity, details are not described herein again.

It should be further understood that, when the communications apparatus 1000 is the second network device, the transceiver unit 1200 in the communications apparatus 1000 may be implemented by a transceiver, for example, may correspond to a transceiver 3100 in a network device 3000 shown in FIG. 11, and the processing unit 1100 in the communications apparatus 1000 may be implemented by at least one processor, for example, may correspond to a processor 3200 in the network device 3000 shown in FIG. 11.

It should be further understood that, when the communications apparatus 1000 is a chip or a chip system configured in a first network device, the transceiver unit 1200 in the communications apparatus 1000 may be implemented by using an input/output interface, and the processing unit 1100 in the communications apparatus 1000 may be implemented by using a processor, a microprocessor, an integrated circuit, or the like integrated into the chip or the chip system.

In another possible design, the communications apparatus 1000 may correspond to the IRS in the foregoing method embodiment, for example, may be an IRS, or a component (for example, a chip or a chip system) configured in the IRS.

It should be understood that the communications apparatus 1000 may correspond to the IRS in the method 600 according to this embodiment of this application. The communications apparatus 1000 may include units configured to perform the method performed by the IRS in the method 600 in FIG. 6. In addition, the units in the communications apparatus 1000 and the foregoing other operations and/or functions are separately used to implement corresponding procedures of the method 600 in FIG. 6.

When the communications apparatus 1000 is configured to perform the method 600 in FIG. 6, the processing unit 1100 may be configured to perform steps S602 and S606 in the method 600, and the transceiver unit 1200 may be configured to perform S601, S605, S607, and S610 in the method 600. It should be understood that, specific processes in which the units perform the foregoing corresponding steps have been described in detail in the foregoing method embodiments. For brevity, details are not described herein again.

It should be further understood that, when the communications apparatus 1000 is the IRS, the transceiver unit 1200 in the communications apparatus 1000 may be implemented by a transceiver, for example, may correspond to a transceiver 3100 in a network device 3000 shown in FIG. 11, and the processing unit 1100 in the communications apparatus 1000 may be implemented by at least one processor, for example, may correspond to a processor 3200 in the network device 3000 shown in FIG. 11.

It should be further understood that, when the communications apparatus 1000 is a chip or a chip system configured in a network device, the transceiver unit 1200 in the communications apparatus 1000 may be implemented by using an input/output interface, and the processing unit 1100 in the communications apparatus 1000 may be implemented by using a processor, a microprocessor, an integrated circuit, or the like integrated into the chip or the chip system.

FIG. 10 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030, to implement the foregoing functions. In a specific implementation, the memory 2030 may alternatively be integrated into the processor 2010, or may be independent of the processor 2010. The processor 2010 may correspond to the processing unit 1100) in FIG. 9.

The transceiver 2020 may correspond to the transceiver unit 1200 in FIG. 9, and may also be referred to as a transceiver unit. The transceiver 2020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that the terminal device 2000 shown in FIG. 10 can implement processes of the terminal device in the method embodiments shown in FIG. 4 and FIG. 6. Operations and/or functions of the modules in the terminal device 2000 are separately intended to implement corresponding procedures in the foregoing method embodiments. For details, refer to the descriptions in the foregoing method embodiments. To avoid repetition, detailed descriptions are appropriately omitted herein.

The processor 2010 may be configured to perform the actions that are implemented by the terminal device and that are described in the foregoing method embodiments, for example, estimate a fourth channel vector and estimate a first channel vector. The transceiver 2020 may be configured to perform the actions of sending to the first network device by the terminal device or receiving from the first network device or the second network device by the terminal device and that are described in the foregoing method embodiments, for example, send a first channel vector and a fourth channel vector, and receive a reference signal. For details, refer to the descriptions in the foregoing method embodiments. Details are not described herein again.

The terminal device 2000 may further include a power supply 2050, configured to supply power to various components or circuits in the terminal device.

In addition, to improve functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 11 is a schematic diagram of a structure of a network device according to an embodiment of this application, for example, may be a schematic diagram of a structure of a base station. The base station 3000 may be applied to the system shown in FIG. 1, and perform functions of the first network device or the second network device in the foregoing method embodiments. As shown in the figure, the base station 3000 may include one or more radio frequency units, for example, a remote radio unit (remote radio unit, RRU) 3100, and one or more baseband units (BBUs) (which may also be referred to as distributed units (DUs)) 3200. The RRU 3100 may be referred to as a transceiver unit or a part of the transceiver unit, and corresponds to the transceiver unit 1100 in FIG. 9. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (which is also be referred to as a receiver machine or a receiver circuit), and the sending unit may correspond to a transmitter (which is also be referred to as a transmitter machine or a transmitter circuit). The RRU 3100 is mainly configured to: receive and send a radio frequency signal, and perform conversion between a radio frequency signal and a baseband signal, for example, configured to send a reference signal to a terminal device, and receive a first channel vector and a fourth channel vector. For details, refer to the descriptions in the foregoing method embodiments. Details are not described herein again.

The BBU 3200 is mainly configured to: perform baseband processing, control a base station, and the like. The RRU 3100 and the BBU 3200 may be physically disposed together, or may be physically disposed separately, namely, a distributed base station.

The BBU 3200 is a control center of the base station, or may be referred to as a processing unit. The BBU 3200 may correspond to the processing unit 1200 in FIG. 9, and is mainly configured to implement a baseband processing function, for example, channel coding, multiplexing, modulation, or spreading. For example, the BBU (processing unit) may be configured to control the base station to perform an operation procedure of the first network device in the foregoing method embodiment, for example, generate a first reference signal. For another example, the BBU (processing unit) may be configured to control the base station to perform an operation procedure of the second network device in the foregoing method embodiment, for example, generate a third reference signal. For details, refer to the descriptions in the foregoing method embodiments. Details are not described herein again.

In an example, the BBU 3200 may include one or more boards. A plurality of boards may jointly support a radio access network (for example, an LTE network) having a single access standard, or may separately support radio access networks (for example, an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, is configured to control the base station to perform the operation procedure related to the network device in the foregoing method embodiments. The memory 3201 and the processor 3202 may serve the one or more boards. In other words, a memory and a processor may be independently disposed on each board, or the plurality of boards may share a same memory and a same processor. In addition, a necessary circuit may further be disposed on each board.

It should be understood that the base station 3000 shown in FIG. 11 can implement processes of the first network device in the method embodiments shown in FIG. 4 and FIG. 6. Operations and/or functions of the modules in the base station 3000 are separately intended to implement corresponding procedures in the foregoing method embodiments. For details, refer to the descriptions in the foregoing method embodiments. To avoid repetition, detailed descriptions are appropriately omitted herein.

It should be understood that the base station 3000 shown in FIG. 11 can implement processes of the second network device in the method embodiment shown in FIG. 4. Operations and/or functions of the modules in the base station 300) are separately intended to implement corresponding procedures in the foregoing method embodiments. For details, refer to the descriptions in the foregoing method embodiments. To avoid repetition, detailed descriptions are appropriately omitted herein.

The BBU 3200 may be configured to perform the actions that are implemented by the first network device or the second network device and that are described in the foregoing method embodiments, and the RRU 3100 may be configured to perform the actions that are of sending to the terminal device by the first network device or receiving from the terminal device by the first network device and that are described in the foregoing method embodiments, or the actions that are of receiving from the first network device by the second network device or sending to the terminal device by the second network device and that are described in the foregoing method embodiments. For details, refer to the descriptions in the foregoing method embodiments. Details are not described herein again.

It should be understood that the base station 3000 shown in FIG. 11 is merely a possible form of the network device, and should not constitute any limitation on this application. The method provided in this application may be applied to a network device in another form. For example, the network device includes an AAU, and may further include a CU and/or a DU, or may include a BBU and an adaptive radio unit (adaptive radio unit, ARU) or a BBU. Alternatively, the network device may be customer premises equipment (customer premises equipment, CPE), or may be a network device in another form. A specific form of the network device is not limited in this application.

The CU and/or the DU may be configured to perform the actions that are implemented by the network device and that are described in the foregoing method embodiments, and the AAU may be configured to perform the actions that are of sending to the first terminal device by the network device or receiving from the first terminal device by the network device and that are described in the foregoing method embodiments. For details, refer to the descriptions in the foregoing method embodiments. Details are not described herein again.

Figure 12:
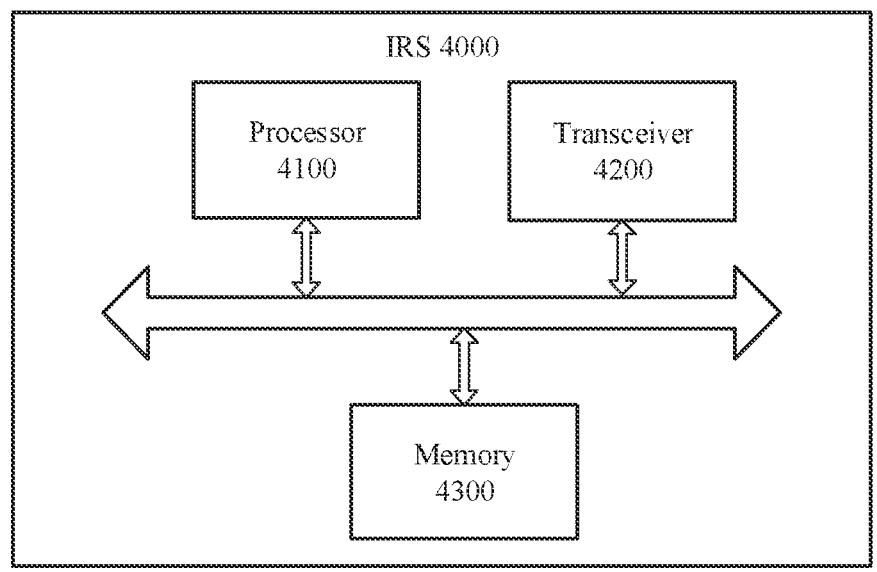
FIG. 12 is a schematic block diagram of an intelligent reflecting surface according to an embodiment of this application.

FIG. 12 is a schematic block diagram of an IRS 4000 according to an embodiment of this application. The IRS 4000 may be applied to the system shown in FIG. 2, and perform functions of the IRS in the foregoing method embodiments. As shown in FIG. 12, the IRS 4000 includes a processor 4100 and a transceiver 4200. The processor 4100 is connected to the transceiver 4200. Optionally, the IRS 4000 further includes a memory 4300, and the memory 4300 is connected to the processor 4100. The processor 4100, the memory 4300, and the transceiver 4200 may communicate with each other through an internal connection path.

The processor 4100 may be configured to perform the actions that are implemented by the IRS and that are described in the foregoing method embodiments, for example, generate a fourth reference signal. The transceiver 2020 may be configured to perform the actions that are of sending to the terminal device by the IRS or receiving from the first network device by the IRS and that are described in the foregoing method embodiments, for example, send a fourth reference signal and receive a third reference signal. For details, refer to the descriptions in the foregoing method embodiments. Details are not described herein again.

It should be understood that the IRS 4000 shown in FIG. 12 can implement processes of the IRS in the method embodiment shown in FIG. 6. Operations and/or functions of the modules in the IRS 4000 are separately intended to implement corresponding procedures in the foregoing method embodiments. For details, refer to the descriptions in the foregoing method embodiments. To avoid repetition, detailed descriptions are appropriately omitted herein.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processing circuit (digital signal processor. DSP), a micro controller unit (micro controller unit, MCU), a programmable controller (programmable logic device, PLD), or another integrated chip. In an implementation process, steps in the foregoing methods may be implemented by using a hardware integrated logical circuit in the processor, or by using instructions in a form of software. The steps of the methods disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or may be performed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, in embodiments of this application, the memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus dynamic random access memory (direct Rambus RAM, DR RAM). It should be noted that, the memory in the system and the method described in this specification is intended to include, but is not limited to, these memories and any memory of another proper type.

According to the method provided in embodiments of this application, this application further provides a computer program product. The computer program product includes computer program code. When the computer program code is run on a computer, the computer is enabled to perform the methods respectively performed by the terminal device, the first network device, and the second network device in the embodiments shown in FIG. 4 and FIG. 6.

According to the method provided in embodiments of this application, this application further provides a computer-readable medium. The computer-readable medium stores program code. When the program code is run on a computer, the computer is enabled to perform the methods respectively performed by the terminal device, the first network device, and the second network device in the embodiments shown in FIG. 4 and FIG. 6.

According to the method provided in embodiments of this application, this application further provides a system. The system includes the one or more terminal devices, the one or more first network devices, and the one or more second network devices.

The first network device, the second network device, and the terminal device in the foregoing apparatus embodiments completely correspond to the first network device, the second network device, and the terminal device in the method embodiments, and corresponding modules or units perform corresponding steps. For example, a communications unit (transceiver) performs the steps of receiving or sending in the method embodiments, and a processing unit (processor) may perform a step other than the sending and receiving steps. For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on the computing device may be components. One or more components may reside in a process and/or a thread of execution, and the component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, in a distributed system, and/or across a network such as the internet interacting with other systems by using the signal).

A person of ordinary skill in the art may be aware that, various illustrative logical blocks (illustrative logical blocks) and steps (steps) that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for a purpose of convenient and brief descriptions, for a detailed working process of the foregoing system, apparatus, and unit, refer to a corresponding process in the foregoing method embodiments. Details are not described herein again.

In several embodiments provided in this application, it should be understood that the disclosed system, the apparatus, and the method may be implemented in another manner. For example, the described apparatus embodiments are merely examples. For example, division into the units is merely logical function division. In an actual implementation, there may be another division manner. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between apparatuses or units may be implemented in an electronic form, a mechanical form, or another form.

The units described as separate components may or may not be physically separated, and components displayed as units may or may not be physical units. That is, the units may be located at one position, or may be distributed to a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units may be integrated into one unit.

In the foregoing embodiments, all or some of the functions of the function units may be implemented by software, hardware, firmware, or any combination thereof. When the software is used to implement the embodiments, all or some of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state drive (solid state drive, SSD)), or the like.

When the functions are implemented in a form of a software function unit and sold or used as an independent product, the functions may be stored in a computer-readable storage medium. Based on such an understanding, the technical solutions of this application essentially or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code such as a USB flash drive, a removable hard disk, a read-only memory (read-only memory, ROM), a random access memory (random access memory. RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel information obtaining method, comprising:
receiving, on a $d^{th}$ port of a terminal device, one or more first reference signals, wherein the one or more first reference signals are from a first network device, $d \in [1, D]$, D is a quantity of ports of the terminal device, and D is a positive integer;
obtaining, by the terminal device, a first channel vector $h_{1,d}$ based on the one or more first reference signals, wherein $h_{1,d}$ is a channel vector of a channel between the $d^{th}$ port of the terminal device and the first network device;
receiving, on the $d^{th}$ port of the terminal device, N second reference signals, wherein N is a quantity of ports of the second reference signals, and N is an integer greater than or equal to 2;
obtaining, by the terminal device, a second channel vector $h_{2,d}$ based on the second reference signals;
calculating, by the terminal device, a third channel vector $h_{3,d}$ based on $h_{1,d}$ and $h_{2,d}$, wherein a quantity of ports of $h_{3,d}$ is less than a quantity of ports of a fourth channel vector $h_{4,d}$, and $h_{4,d}$ is a channel vector of a channel between the first network device, a second network device, and the $d^{th}$ port of the terminal device; and calculating, by the terminal device, $h_{4,d}$ based on $h_{3,d}$.

2. The method according to claim 1, wherein the calculating, by the terminal device, a third channel vector $h_{3,d}$ based on $h_{1,d}$ and $h_{2,d}$ comprises:

calculating, by the terminal device, $h_{3,d}$ according to a formula $h_{3,d}=h_{2,d}-[h_{1,d}w_1, h_{1,d}w_2, \ldots, h_{1,d}w_N]^T$, wherein $w_n(n=1, 2, \ldots, N)$ is a first precoding matrix.

3. The method according to claim 1, wherein the calculating, by the terminal device, $h_{4,d}$ based on $h_{3,d}$ comprises:

calculating, by the terminal device, $h_{4,d}$ according to a formula $h_{3,d}=\Phi h_{4,d}$, wherein $\Phi$ is a function $f(\theta_n(n=1, 2, \ldots, N), w_n(n=1, 2, \ldots, N))$ of a first precoding matrix $w_n(n=1, 2, \ldots, N)$ and a second precoding matrix $\theta_n(n=1, 2, \ldots, N)$.

4. The method according to claim 3, wherein $\Phi$ is represented as $\Phi=[w_1^T \otimes \theta_1^H, w_2^T \otimes \theta_2^H, \ldots, w_N^T \otimes \theta_N^H]^T$.

5. The method according to claim 3, wherein the method further comprises:

calculating, by the terminal device, the first precoding matrix and the second precoding matrix; and sending, by the terminal device, the first precoding matrix and the second precoding matrix to the first network device.

6. The method according to claim 3, wherein the method further comprises:

receiving, by the terminal device, the first precoding matrix and the second precoding matrix.

7. The method according to claim 3, wherein the first precoding matrix and the second precoding matrix are specified in a communications protocol.

8. A channel information obtaining method, comprising:

receiving, by a second network device, N third reference signals from a first network device, wherein N is a quantity of ports of the third reference signals, and N is an integer greater than or equal to 2;

generating, by the second network device, N fourth reference signals, wherein an $n^{th}$ fourth reference signal is generated after the second network device precodes an $n^{th}$ third reference signal based on a second precoding matrix $\theta_n(n=1, 2, \ldots, N)$, $n \in [1, N]$, the second precoding matrix is used to process a second channel vector $h_{4,d}$ to obtain a third channel vector $h_{3,d}$, a quantity of ports of $h_{3,d}$ is less than a quantity of ports of $h_{4,d}$, $h_{4,d}$ is a channel vector of a channel between the first network device, the second network device, and a $d^{th}$ port of a terminal device, $d \in [1, D]$, D is a quantity of ports of the terminal device, and D is a positive integer; and sending, by the second network device, the N fourth reference signals to the terminal device.

9. The method according to claim 8, wherein the second precoding matrix is specifically represented as $\theta_n(n=1, 2, \ldots, N)=Vb_n(n=1, 2, \ldots, N)$, V is a matrix formed by a group of orthogonal bases, and $b_n(n=1, 2, \ldots, N)$ is one of the following matrices: a Gaussian random distribution matrix or a Bernoulli random distribution matrix.

10. The method according to claim 8, wherein before the generating, by the second network device, N second reference signals, the method further comprises:

receiving, by the second network device, the second precoding matrix from the first network device.

11. The method according to claim 8, wherein the second precoding matrix is specified in a communications protocol.

12. A communication device, comprising:

a receiver, configured to receive, on a $d^{th}$ port of a terminal device, one or more first reference signals, wherein the one or more first reference signals are from a first network device, $d \in [1, D]$, D is a quantity of ports of the terminal device, and D is a positive integer;

at least one processor, configured to obtain, a first channel vector $h_{1,d}$ based on the one or more first reference signals, wherein $h_{1,d}$ is a channel vector of a channel between the $d^{th}$ port of the terminal device and the first network device;

the receiver, further configured to receive, on the $d^{th}$ port of the terminal device, N second reference signals, wherein N is a quantity of ports of the second reference signals, and N is an integer greater than or equal to 2;

the at least one processor, further configured to obtain, a second channel vector $h_{2,d}$ based on the second reference signals;

the at least one processor, further configured to calculate, a third channel vector $h_{3,d}$ based on $h_{1,d}$ and $h_{2,d}$, wherein a quantity of ports of $h_{3,d}$ is less than a quantity of ports of a fourth channel vector $h_{4,d}$, and $h_{4,d}$ is a channel vector of a channel between the first network device, a second network device, and the $d^{th}$ port of the terminal device; and the at least one processor, further configured to calculate, $h_{4,d}$ based on $h_{3,d}$.

13. The device according to claim 12, wherein the at least one processor, further configured to calculate, $h_{3,d}$ according to a formula $h_{3,d}=h_{2,d}-[h_{1,d}w_1, h_{1,d}w_2, \ldots, h_{1,d}w_N]^T$, where $w_n(n=1, 2, \ldots, N)$ is a first precoding matrix.

14. The device according to claim 12, wherein the at least one processor, further configured to calculate, $h_{4,d}$ according to a formula $h_{3,d}=\Phi h_{4,d}$, where $\Phi$ is a function $f(\theta_n(n=1, 2, \ldots, N), w_n(n=1, 2, \ldots, N))$ of a first precoding matrix $w_n(n=1,2, \ldots, N)$ and a second precoding matrix $\theta_n(n=1, 2, \ldots, N)$.

15. The device according to claim 13, wherein $\Phi$ is represented as $\Phi=[w_1^T \otimes \theta_1^H, w_2^T \otimes \theta_2^H, \ldots, w_N^T \otimes \theta_N^H]^T$.

16. The device according to claim 14, wherein the at least one processor, further configured to calculate, the first precoding matrix and the second precoding matrix; and the device further comprises:

a transmitter, configured to send the first precoding matrix and the second precoding matrix to the first network device.

17. The device according to claim 14, wherein the receiver, further configured to receive, the first precoding matrix and the second precoding matrix.

18. The device according to claim 14, wherein the first precoding matrix and the second precoding matrix are specified in a communications protocol.

* * * * *

UNITED STATES PATENT AND TRADEMARK OFFICE
CERTIFICATE OF CORRECTION

PATENT NO. : 11,923,929 B2
APPLICATION NO. : 17/741143
DATED : March 5, 2024
INVENTOR(S) : Xinyu Gao and Kunpeng Liu It is certified that error appears in the above-identified patent and that said Letters Patent is hereby corrected as shown below:

On the Title Page

Column 2 (Abstract), Line 9, please delete "$h_{1,d}$ a" and insert therefore -- $h_{1,d}$ is a --;

In the Claims

Column 37, Line 1, Claim 1, please delete "$h_{4,d}$ is" and insert therefore -- $h_{4,d}$ is --;

Column 37, Line 18, Claim 3, please delete "$\theta_n$ (n=1, 2, . . ., N)." and insert therefore -- $\theta_n$(n=1, 2, . . ., N). --;

Column 38, Line 40 (Approx.), Claim 14, please delete "where" and insert therefore -- wherein --;

Column 38, Line 42, Claim 14, please delete "1,2," and insert therefore -- 1, 2, --.

Signed and Sealed this
Eighteenth Day of June, 2024

Katherine Kelly Vidal
*Director of the United States Patent and Trademark Office*